US009051696B1

(12) United States Patent
Coats et al.

(10) Patent No.: US 9,051,696 B1
(45) Date of Patent: Jun. 9, 2015

(54) MODULAR CONFIGURABLE PAVING APPARATUS AND MODULAR CONFIGURABLE PAVING OPERATION SYSTEM

(71) Applicant: GOMACO Corporation, Ida Grove, IA (US)

(72) Inventors: Robert E. Coats, Sac City, IA (US); Todd Hoaglund, Kiron, IA (US); Lex Jacobson, Battle Creek, IA (US); Kevin L. Klein, Denison, IA (US)

(73) Assignee: GOMACO Corporation, Ida Grove, IA (US)

( * ) Notice: Subject to any disclaimer, the term of this patent is extended or adjusted under 35 U.S.C. 154(b) by 0 days.

(21) Appl. No.: 14/172,461

(22) Filed: Feb. 4, 2014

Related U.S. Application Data

(60) Provisional application No. 61/760,442, filed on Feb. 4, 2013.

(51) Int. Cl.
  *E01C 19/00* (2006.01)
  *E01C 19/42* (2006.01)
(52) U.S. Cl.
  CPC *E01C 19/00* (2013.01); *E01C 19/42* (2013.01)
(58) Field of Classification Search
  CPC .................................. E01C 19/00; E01C 19/42
  USPC .................. 404/83, 85, 93, 101, 104, 105
  See application file for complete search history.

(56) References Cited

U.S. PATENT DOCUMENTS

| 4,741,643 | A  | * | 5/1988  | Allen ............................. 404/114 |
| 4,806,047 | A  | * | 2/1989  | Morrison ....................... 404/118 |
| 5,871,302 | A  | * | 2/1999  | Carlson .......................... 404/96 |
| 5,941,658 | A  | * | 8/1999  | Dahlinger et al. ........... 404/84.1 |
| 5,988,939 | A  | * | 11/1999 | Allen et al. ................... 404/116 |
| 6,234,713 | B1 | * | 5/2001  | Rowe et al. ................... 404/116 |
| 6,457,902 | B1 | * | 10/2002 | Artzberger et al. ............. 404/75 |
| 6,685,390 | B1 | * | 2/2004  | Eitzen ........................... 404/119 |
| 7,318,688 | B1 | * | 1/2008  | Bavaro et al. ................. 404/119 |
| 7,721,831 | B2 |   | 5/2010  | Smolders et al. |
| 2002/0119004 | A1 | * | 8/2002 | Sipherd et al. ................ 404/111 |
| 2003/0108390 | A1 | * | 6/2003 | Carlson ......................... 404/118 |
| 2010/0266339 | A1 | * | 10/2010 | Guntert et al. ................ 404/105 |
| 2011/0236129 | A1 | * | 9/2011  | Guntert et al. .................. 404/72 |

* cited by examiner

*Primary Examiner* — Raymond W Addie
(74) *Attorney, Agent, or Firm* — Suiter Swantz pc llo

(57) ABSTRACT

A modularly configurable paving operations system includes a modular framework of frame inserts, the width of the system extendible or reducible by the addition or removal of additional frame inserts. An end structure at either end of the modular framework has a front leg and a rear leg with a steerable crawler connected to each leg. Individual frame inserts may include a rail system along which end structures, accessories, or components may laterally slide. A control system can rotate one or more steerable crawlers via a steering assembly to drive, steer, or reconfigure the system. The control system may also include a tining control system, a grade control system, a spray control system, sensors and sensor arrays, and a user interface. The system may accommodate one or more accessories through an undercarriage mounted to the modular framework, which may further include a hydraulic height adjuster.

18 Claims, 36 Drawing Sheets

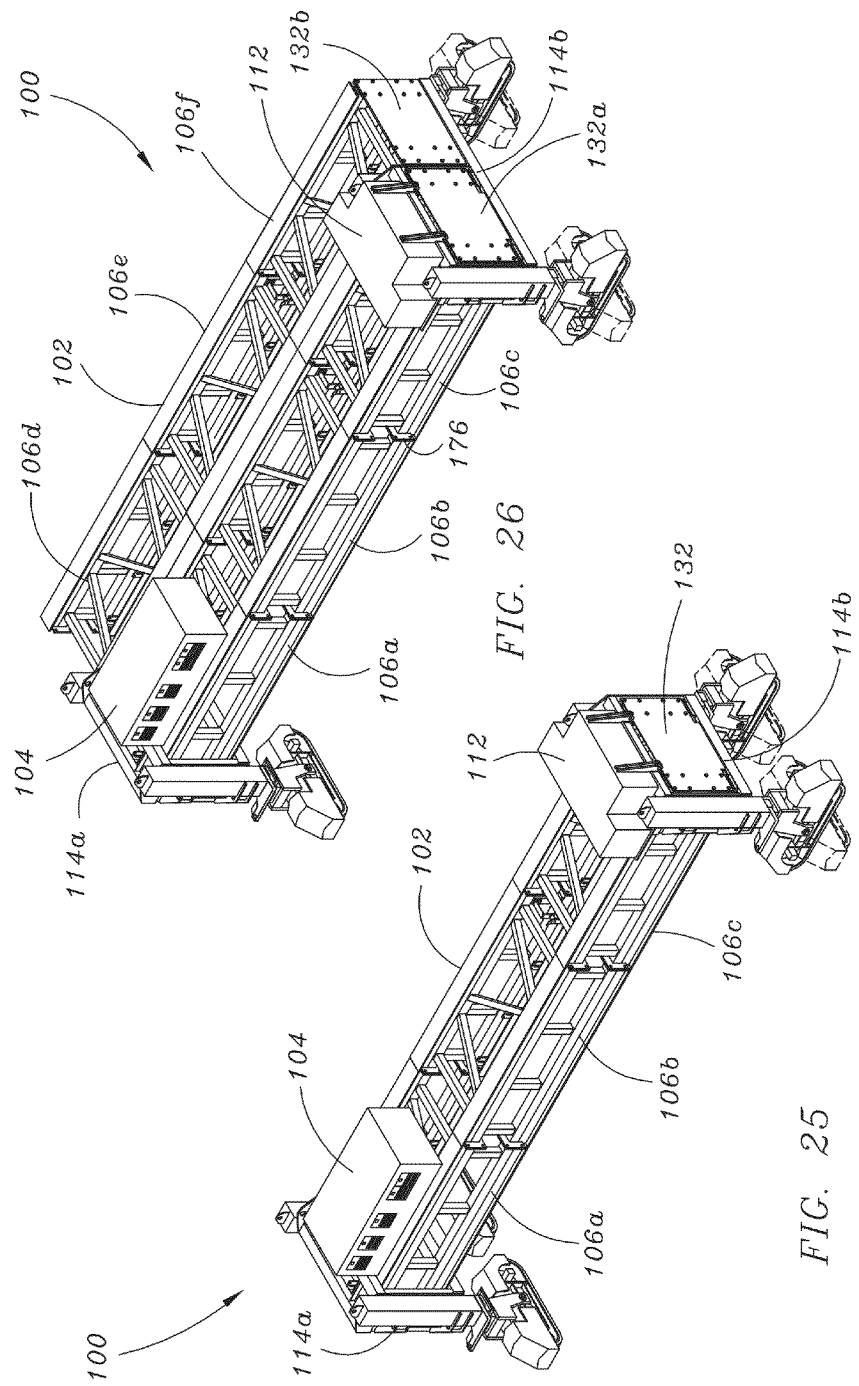

MODULAR CONFIGURABLE PAVING APPARATUS AND MODULAR CONFIGURABLE PAVING OPERATION SYSTEM

CROSS-REFERENCE TO RELATED APPLICATIONS

The present application claims the benefit under 35 U.S.C. §119(e) of U.S. Provisional Application Ser. No. 61/760,442, filed Feb. 4, 2013. Said U.S. Provisional Application is herein incorporated by reference in its entirety.

TECHNICAL FIELD

The present invention relates generally to the field of paving operations, and more particularly to paving machines with component/assembly modularity for ease of manufacture, improved user reconfigurability, and improved transportability.

BACKGROUND

Paving machines (such as texture/cure machines or like paving operations systems) are typically 2-track or 4-track (incorporating single-track or double-track end cars respectively), single-beam or multiple-beam, a first width or a second width, a first length or a second length, or a single tool, dual tool, or multi-tool (accessory). Two-track machines skid steer with the potential for variance in the perpendicularity of the machine to the slab, causing distortions to the parallelism of the grooves to the slab's edge. 4-track steerable machines negate this shortcoming with increased complexity.

Paving depth, surface preparation, transitions (slope and slab) and the like have traditionally been controlled by grade control with or without a hinge mechanism (crown transitions). Transition Adjustment (TA) sections add much in the way of cost and complexity to the frame. Groove depth error is subject to error in the control of crown angle in both the paver and the texture machines.

Paving equipment, including most paving machine frameworks and components, are generally designed and constructed to accommodate varying surface widths and/or tools/accessories. This is done through combinations of fixed-width modular structures and telescoping modular structures. A fixed structural support or bolster is fitted to the end of the machine framework by joining it to the grade control legs. End cars or other end structures must be detached to add or remove fixed-width frame members, and telescoping structures used for width changes add cost and complexity.

SUMMARY

Embodiments of the present invention are directed to a paving operations system having a modular framework that incorporates a rail system to facilitate mounting of accessories/components and support of the framework by an end structure, or end car, at either end of the framework. This allows for repositioning an end structure relative to the modular framework and adjusting the operating width of the system without the complexity of a telescoping frame member. The end structure and accessories may be moved along the framework by lateral sliding action along the rail system. Additional modular frame members may be added to or removed from the main framework's outside end without removal of end structure, which is simply moved along the framework to its new position.

Preferred embodiments of the paving operations system incorporate a steering assembly at each end structure configured to convert the system between an operational/paving configuration and a transitional configuration. The steering assembly can utilize sensor-equipped steering cylinders to rotate steerable crawlers mounted to the end structures individually or in unison. Through a control system, the steering assembly can direct the position of the system and make precise steering corrections. The steering assembly can also position the steerable crawlers on one side of the system for lateral movement of an end structure along the modular framework to a new position.

In preferred embodiments, the modular framework of the system may be fitted with or connected to a range of accessories such as materials pans, spreader plows, longitudinal and transverse texture rakes, dowel bar inserters, burlap drags, pavement cure distributors, finishing screeds, or surface trimming systems. A paving operations system thus assembled from a selection of modular components and accessories can accommodate a diverse range of functionalities through a single base apparatus. For example, embodiments of the system may include an undercarriage fitted with pan and spreader accessories for paving a surface. Undercarriage accessories can then be swapped out for texturing accessories connected to the control system for precise tining and crowning, and later swapped out again for pavement curing accessories. In embodiments, the system incorporates sonic slab tracking and closed loop control of the grooving rake's position in addition to the machine's grade control to govern tining depth both for longitudinal and transverse grooves through any crown variance. Such a configuration preferably permits precise control without the added complexity of hinge mechanisms for crowning.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which:

FIG. 25 is a perspective view of an embodiment of a paving operations system of the present invention;

FIG. 26 is a perspective view of an alternative embodiment of a paving operations system of the present invention;

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1:
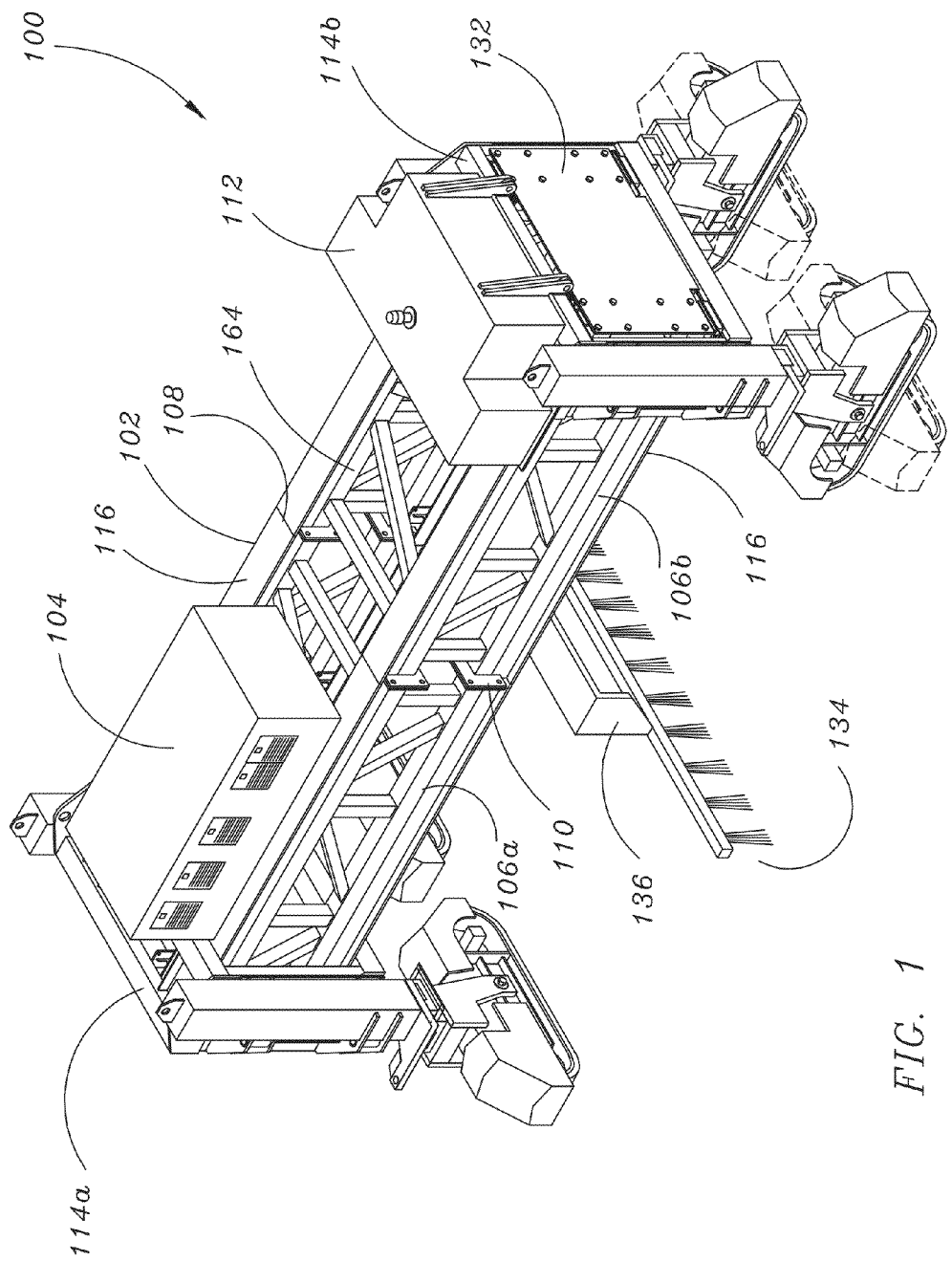
FIG. 1 is a perspective view of a four-track paving operations system having a readily extendable transverse width adjustment according to an embodiment of the present invention.

FIG. 1 depicts an embodiment of a paving operations system 100 of the present invention. System 100 includes a modular framework 102 supported at either end by drive end car 114a and walking end car 114b. Modular framework 102 includes individual frame members 106a and 106b. In preferred embodiments, modular framework 102 incorporates structural tube or lattice type framing, and individual frame members 106 may be assembled from prefabricated and pre-sized frame panels 164. Frame members 106a and 106b include a series of frame mount flanges 110, by which frame members 106a and 106b may be bolted to each other or to end cars 114a and 114b via attachment plate 132. In embodiments, modular framework 102 includes a rail system 116 along its top and bottom sides for mounting accessories to modular framework 102 as well as support of the framework by end cars 114a and 114b. Individual rails mounted on frame members 106a and 106b seamlessly contact each other at frame joint 108, where frame members 106a and 106b connect. Rail system 116 allows for simplified system width adjustment via positioning end car 114b relative to modular framework 102 without the complexity of a telescoping frame member. In preferred embodiments, rail system 116 is a T-rail system along which end cars 114a and 114b are configured to laterally slide. Rail system 116 may also incorporate alternative rail/slot designs or guide systems. Additional frame members 106 may be added to, or removed from, modular framework 102 without the detachment of walking end car 114b. System 100 may also include a gasoline engine, diesel engine, or other like engine console 104 bolted to the frame insert 106a directly connected to drive end car 114a. System 100 may similarly include a cure tank or other accessory pod 112 bolted to the frame insert 106b directly connected to walking end car 114b. When not bolted to frame insert 106b, accessory pod 112 can further slide along rail system 116 for repositioning. In embodiments, accessory mount 136 may be connected to the underside of modular framework 102. Accessory mount 136 may, for example, accommodate a texture rake 134 for transverse or longitudinal tining operations, a spray bar assembly 152 for use in conjunction with cure tank 112, or other like functional accessories.

Figure 2:
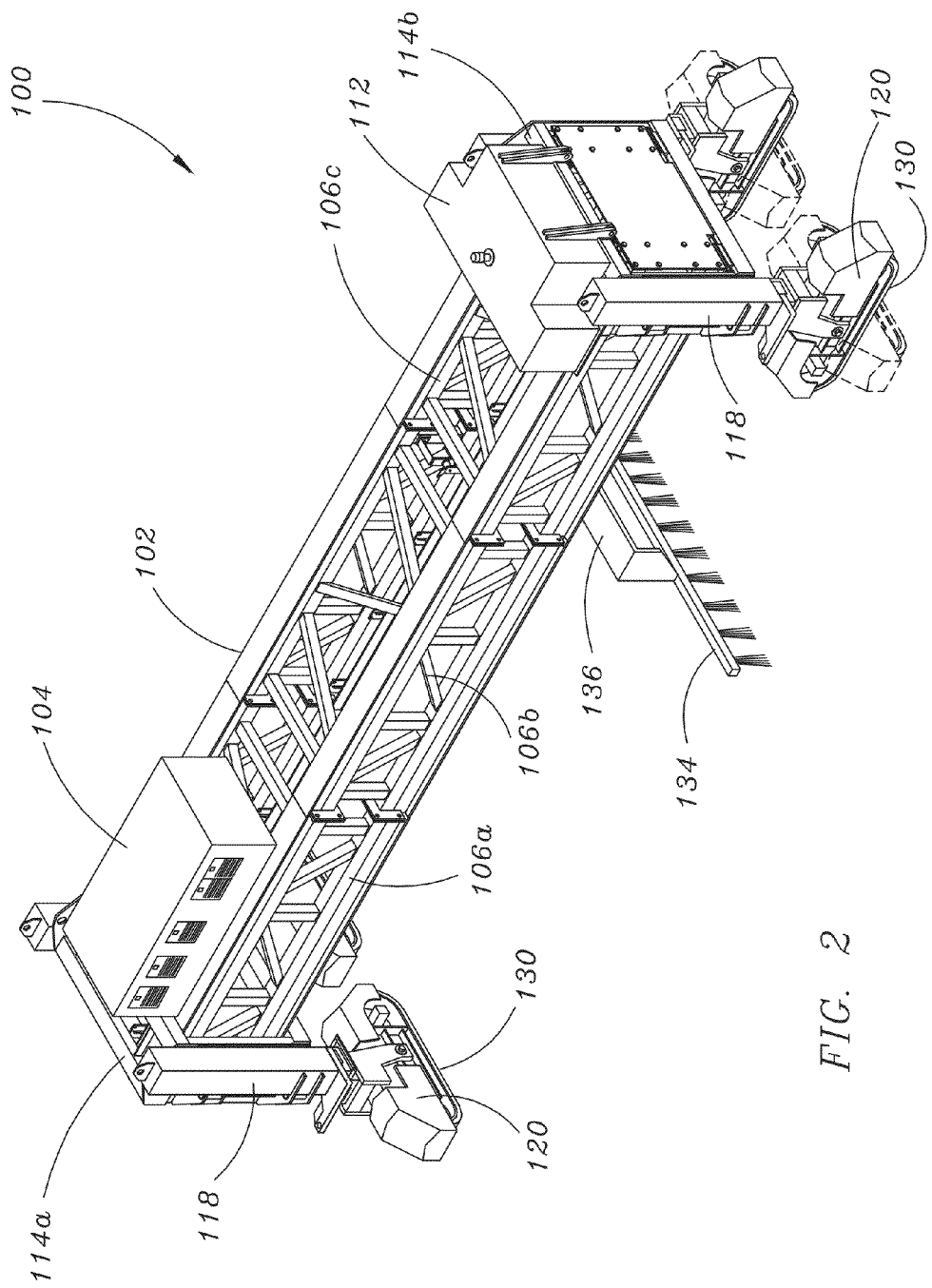
FIG. 2 is a perspective view of an embodiment of the four-track paving operations system extended by the addition of a frame member.

Referring to FIG. 2, drive end car 114a and walking end car 114b further include front and rear legs 118 at each end of system 100 for vertical support. Each leg 118 is equipped with a steerable crawler 120 (including track 130, fender, drive, and drive assembly). In some embodiments, front and rear legs 118 may be configured to hydraulically raise or lower modular framework 102 above ground level. In preferred embodiments, engine console 104 is bolted to the frame member 106a directly connected to drive end car 114a, and accessory pod 112 is bolted to the frame member 106c directly connected to walking end car 114b. Modular framework 102 may include an additional frame member 106b as a result of an operation to extend the width of system 100 and an accessory mount 136 to which texture rake 134 has been transversely mounted. Preferred embodiments of accessory mount 136 can accommodate other accessories or a longitudinally mounted texture rake 134.

Figures 3A, 3B:
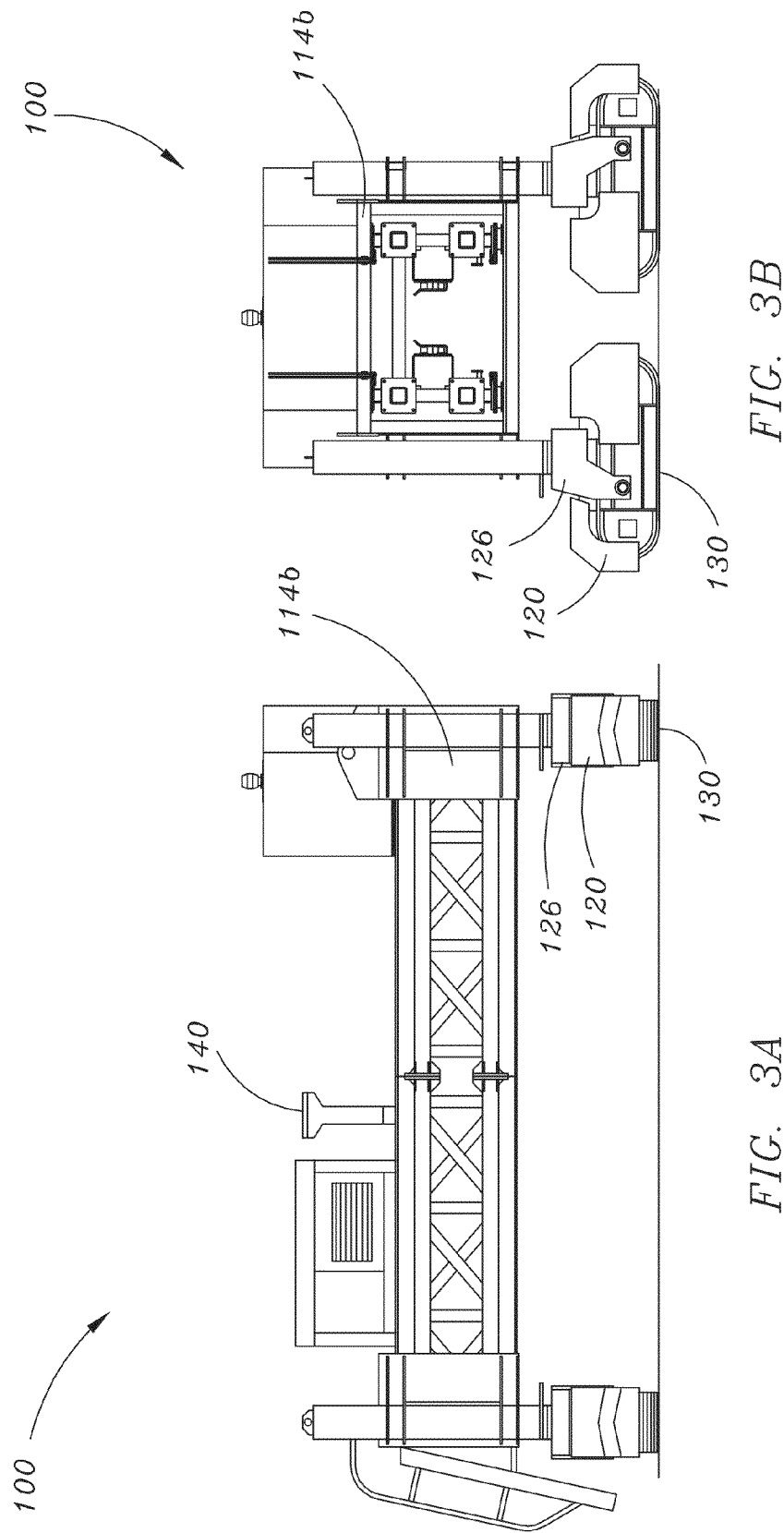
FIG. 3A is a front elevational view of an embodiment of the paving operations system in an operational/paving configuration.
FIG. 3B is an end elevational view of an embodiment of the paving operations system in an operational/paving configuration illustrating means for attaching an additional frame insert to a walking end car.

Referring to FIGS. 3A and 3B, embodiments of paving operations system 100 may be transitioned into several useful configurations. FIG. 3A illustrates an embodiment of system 100 in an operational/paving configuration. Front steerable crawlers 120 mounted to adjustable legs 118 may be rotated by track mount yokes 126 to an operating orientation both substantially perpendicular to modular framework 102 and substantially parallel to a working surface. Tracks 130 of steerable crawlers 120 contact the ground as system 100 travels along the working surface while a control system electronically maintains the perpendicularity of system 100 to the working surface. In preferred embodiments, operator console 140 may be secured to modular framework 102 to provide the operator of system 100 with a means of interfacing with and directing the control system of system 100. In preferred embodiments, the control system of system 100 may include the control system substantially disclosed in provisional application 61/760,416, herein incorporated in its entirety, or any like combination of hardware and software for controlling the components of system 100. Referring to FIG. 3B, in embodiments of system 100 both front and rear steerable crawlers 120 connected to walking end car 114b may be configured to steer in unison or individually to maintain system 100 in an orientation substantially parallel to the direction of travel along a work surface.

Figure 4B:
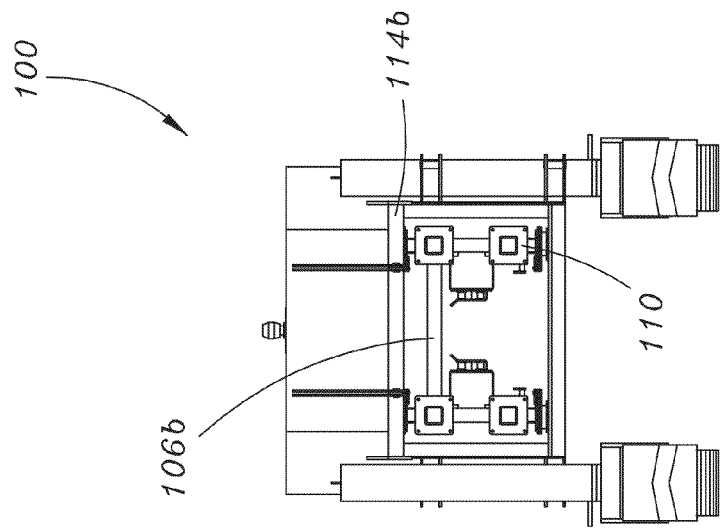
FIG. 4B is an end elevational view of an embodiment of the paving operations system in a transitional configuration illustrating means for attaching an additional frame insert to a walking end car.
Figure 4A:
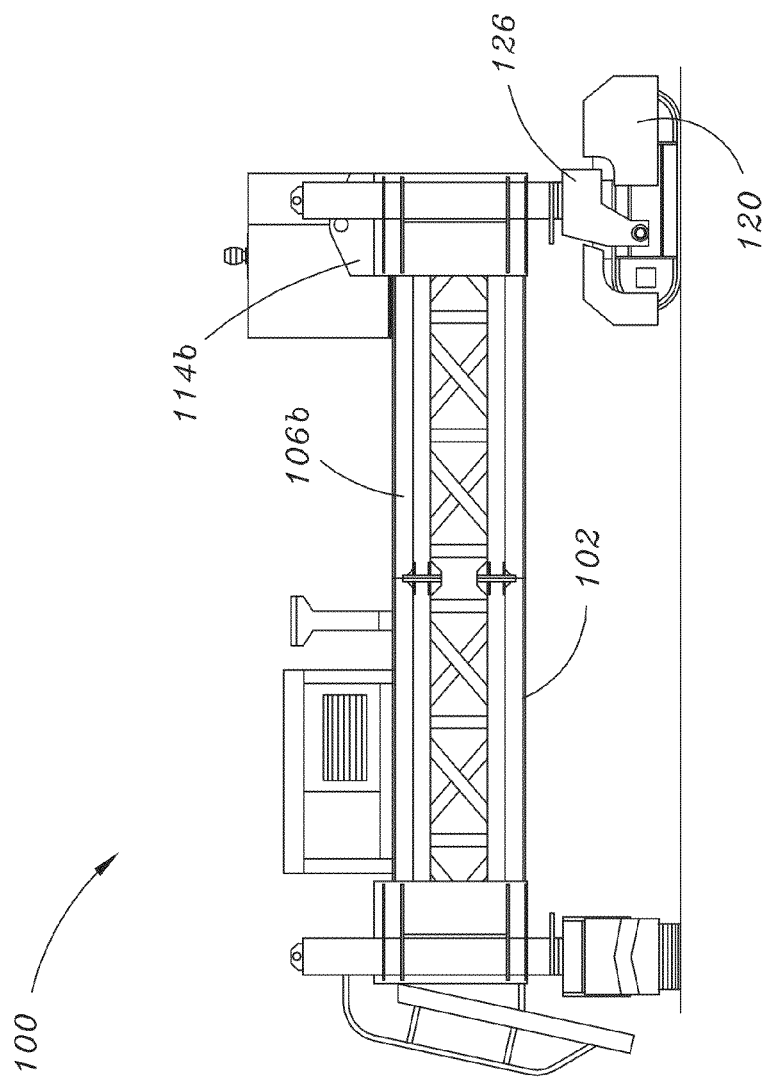
FIG. 4A is a front elevational view of an embodiment of the paving operations system with an end car in an operating/paving configuration and an end car in a transitional configuration.

Referring to FIGS. 4A and 4B, in embodiments of system 100 the control system can convert system 100 to a transitional configuration for the addition or removal of frame members or other accessories or for the transport of system 100. Front and rear steerable crawlers 120 connected to end cars 114a and 114b may be rotated by track mount yokes 126 to a transport orientation substantially parallel to the transverse width of modular framework 102, and substantially perpendicular to the operational direction of travel of system 100. Referring to FIG. 4B, an attachment plate may be removed from walking end car 114b to expose frame mount flanges 110 of frame member 106b for attachment of an additional frame member. In alternative embodiments, an attachment plate may be secured to frame mount flanges 110 of frame member 106b as a step in reducing the width of system 100.

Figure 5A:
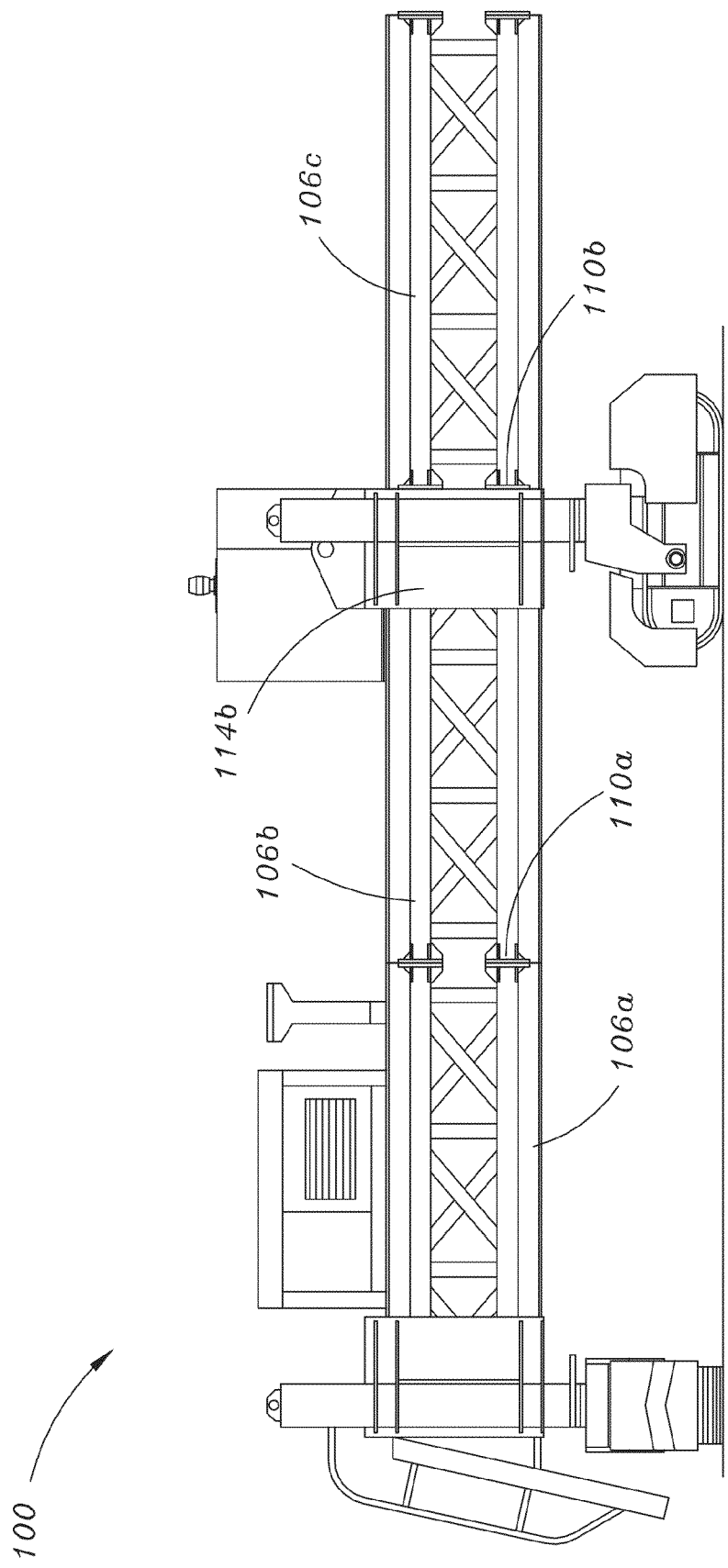
FIG. 5A is a front elevational view of an embodiment of the paving operations system in a transitional configuration with a walking end car and an additional frame insert attached.
Figure 5B:
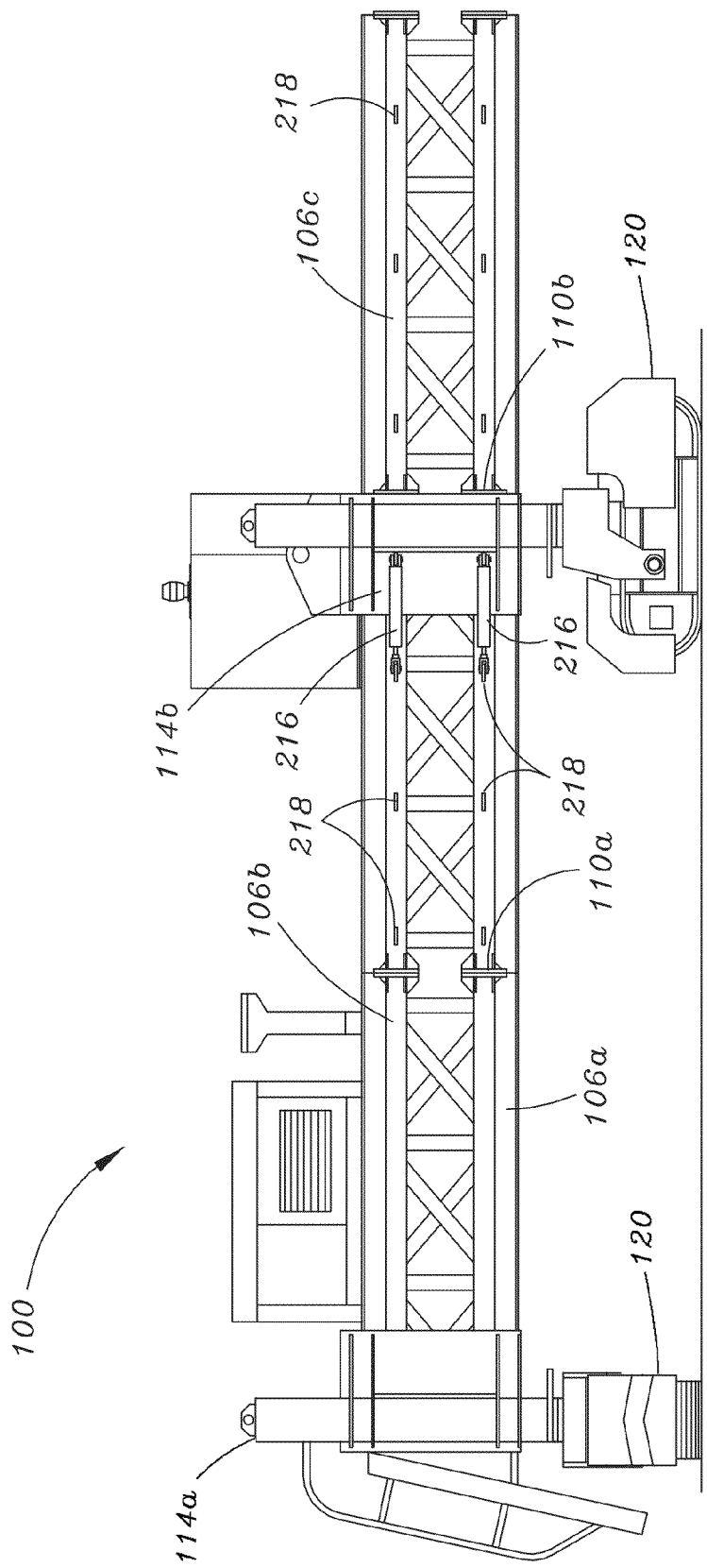
FIG. 5B is a front elevational view of an embodiment of the paving operations system in a transitional configuration with a hydraulically driven walking end car and an additional frame insert attached.

FIGS. 5A and 5B illustrate an embodiment of system 100 after a primary stage of width extension, subsequent to the attachment of additional frame member 106c. Referring to FIG. 5A, system 100 is in a transitional configuration, as shown by the transverse orientation of steerable crawlers 120 connected to walking end car 114b. For transport and/or reconfiguration, orientation of both end cars 114 is preferably generally or substantially parallel (not perpendicular) both to each other and to modular framework 102 (FIGS. 4A, 5B, 6, 7A, 25, and 26). Walking end car 114b remains in a position substantially flush with frame mount flanges 110b of frame member 106b. Additional frame member 106c can then be connected to frame member 106b via frame mount flanges 110b, as frame member 106b is connected to frame member 106a via frame mount flanges 110a; in preferred embodiments frame members 106b and 106c are bolted together. In alternative embodiments, frame member 106c may be detached from frame member 106b as an intermediate step in reducing the width of system 100.

Referring to FIG. 5B, in preferred embodiments walking end car 114b may be hydraulically pushed/pulled (via hydraulic cylinders 216) along modular framework 102 with or without walking (from attachment points 218). System 100 remains in a transitional configuration; steerable crawlers 120 connected to walking end car 114b have been rotated to a transverse orientation, parallel to modular framework 102, while steerable crawlers 120 connected to drive end car 114a remain perpendicular to modular framework 102. In preferred embodiments, steerable crawlers 120 connected to drive end car 114a may be rotated to a transverse orientation parallel to modular framework 102 (and parallel to steerable crawlers 120 connected to walking end car 114b), thus converting system 100 to a transport configuration. Once converted to a transport configuration, system 100 may then be driven onto another vehicle for transport. In embodiments, conversion of system 100 to transport configuration (i.e., rotation of both sets of steerable crawlers 120 to transverse orientation) may also be performed before walking end car 114b is moved along modular framework 102 to a new position.

Figure 6:
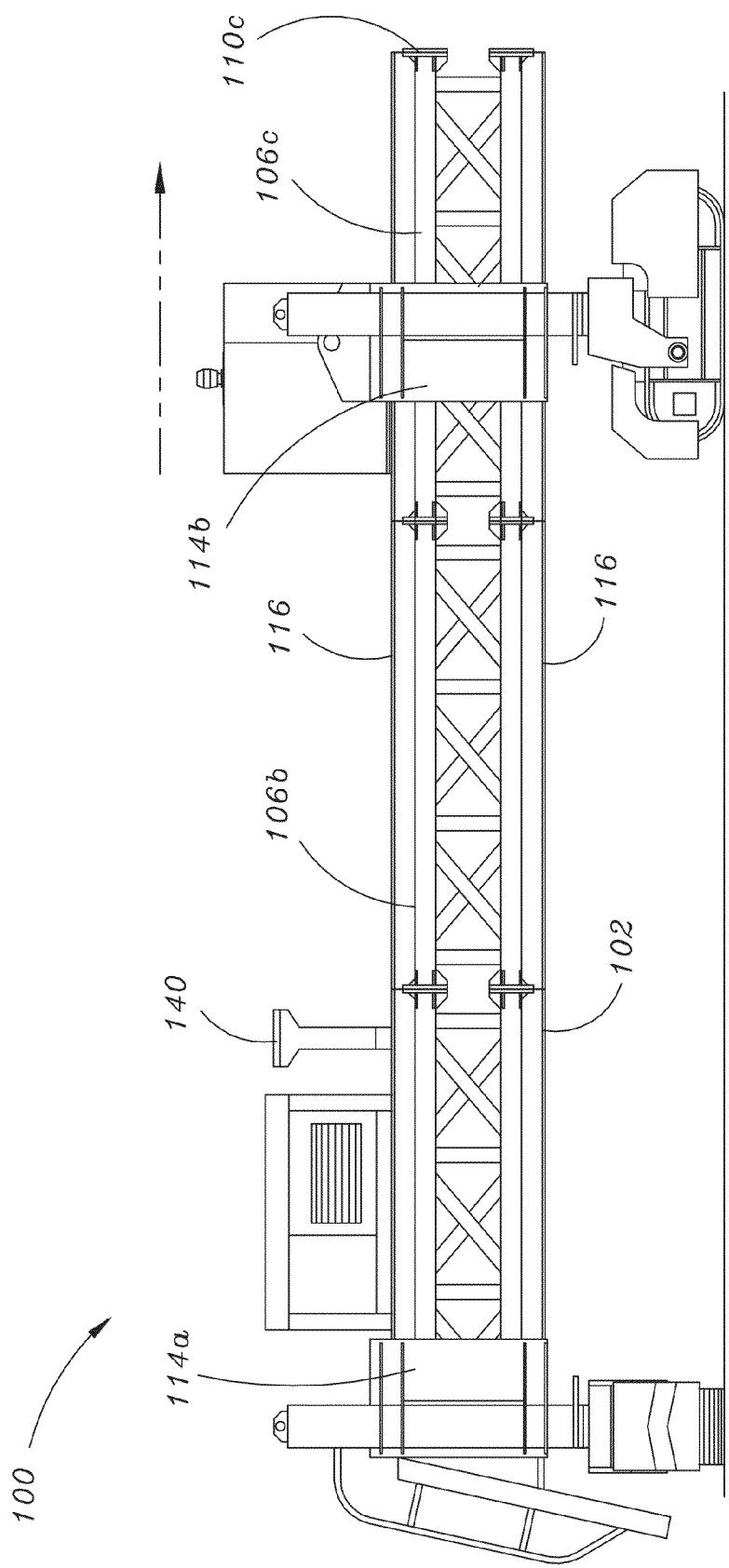
FIG. 6 is a front elevational view of an embodiment of the paving operations system in a transitional configuration with a walking end car shown traversing an additional frame insert to extend transverse width.

FIG. 6 illustrates an embodiment of system 100 of the present invention after a secondary stage of width extension. After frame member 106c is attached to frame member 106b, walking end car 114b is moved along the transverse width of modular framework 102. In embodiments, walking end car 114b is configured to slide transversely along the rail system 116 of modular framework 102 to a position substantially flush with frame mount flanges 110c of frame member 106c. Walking end car 114b may be walked manually along modular framework 102, steered by the control system of system 100 in response to user input through operator console 140, or propelled along modular framework 102 via one or more hydraulic cylinders 216. In alternative embodiments, walking end car 114b may be moved transversely in the direction of drive end car 114*a* in preparation for the removal of frame member 106*c* in order to reduce the overall width of system 100.

Figure 7A:
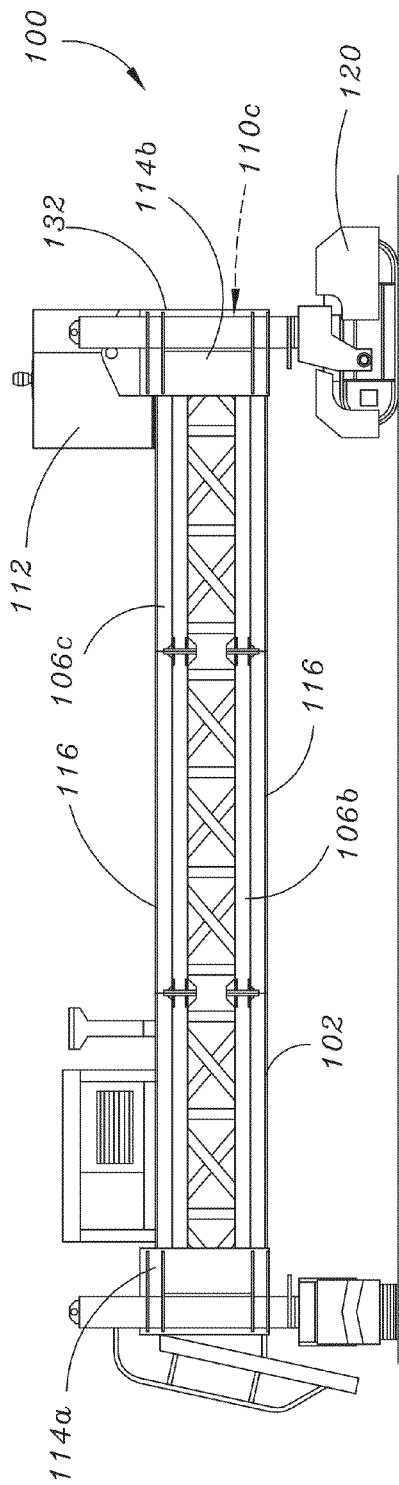
FIG. 7A is a front elevational view of an embodiment of the paving operations system in an transitional configuration with a walking end car at the end of an additional frame insertion.
Figure 7B:
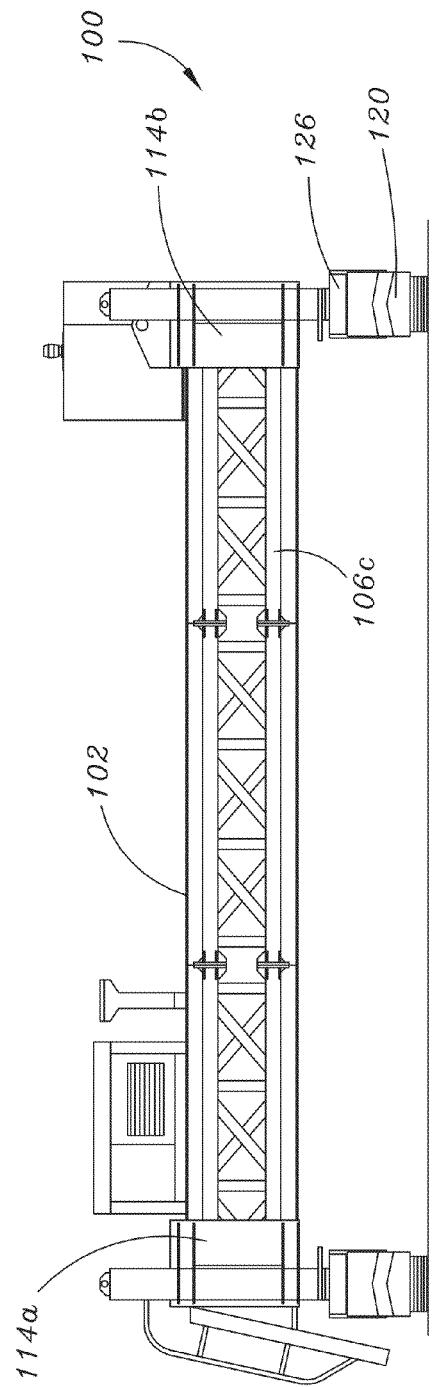
FIG. 7B is a front elevational view of an embodiment of the paving operations system in an operational/paving configuration with a walking end car at the end of an additional frame insertion.

FIGS. 7A and 7B illustrate an embodiment of system 100 after a tertiary stage of width extension of the present invention. Referring to FIG. 7A, walking end car 114*b* has been moved transversely along rail system 116 of modular framework 102 to a position substantially flush with frame mount flanges 110*c* (not shown) of frame member 106*c*, and attachment plate 132 has been secured to frame mount flanges 110*c*. Accessory pod 112, formerly secured to frame member 106*b*, has been moved transversely along rail system 116 and secured to frame member 106*c*. Any hydraulic hose extensions or other connections to accessory pod 112 or other components connected to walking end car 114*b* may be reconnected or extended across frame member 106*c*. Note that system 100 remains in a transitional configuration: front and rear steerable crawlers 120 connected to walking end car 114*b* are oriented perpendicular to steerable crawlers 120 connected to drive end car 114*a* and parallel to the transverse width of modular framework 102.

Referring to FIG. 7B, as a final stage of a width extension operation of the present invention an embodiment of system 100 may be returned to an operational/paving configuration by rotating steerable crawlers 120 connected to end cars 114 (via track mount yokes 126) to an operating orientation both perpendicular to modular framework 102. In alternate embodiments, steerable crawlers 120 connected to end cars 114 may be rotated by track mount yokes 126 in an orientation parallel to the transverse width of modular framework 102 as a preliminary stage of reducing the width of system 100 by removing frame member 106*c*.

Figure 8:
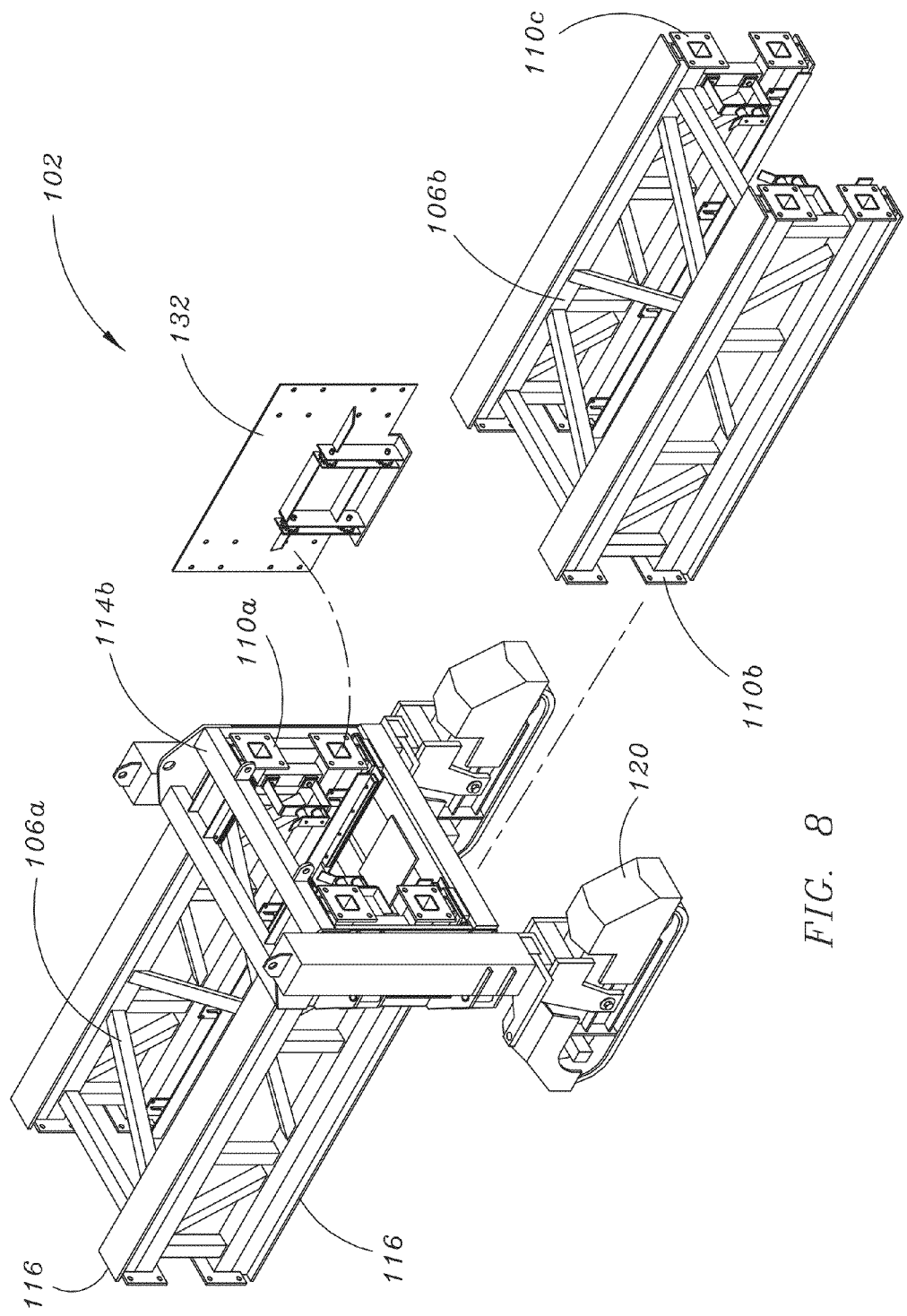
FIG. 8 is a partial perspective end view of an embodiment of the paving operations system illustrating removal of an attachment plate for insertion of an additional frame member.

FIG. 8 illustrates an embodiment of a primary stage of extending the width of modular framework 102 including converting system 100 to a transitional configuration (as shown by the transverse orientation of steerable crawlers 120 connected to walking end car 114*b*). After attachment plate 132 is removed from walking end car 114*b* to expose frame mount flanges 110*a* of frame member 106*a*, additional frame member 106*b* can then be connected to frame member 106*a* via frame mount flanges 110*a* and 110*b*. Once frame members 106*a* and 106*b* are connected, walking end car 114*b* can then slide along the rail system 116 of modular framework 102, (walked, driven or hydraulically propelled) to a desired position substantially flush with frame mount flanges 110*c* of frame member 106*b*.

Figure 9A:
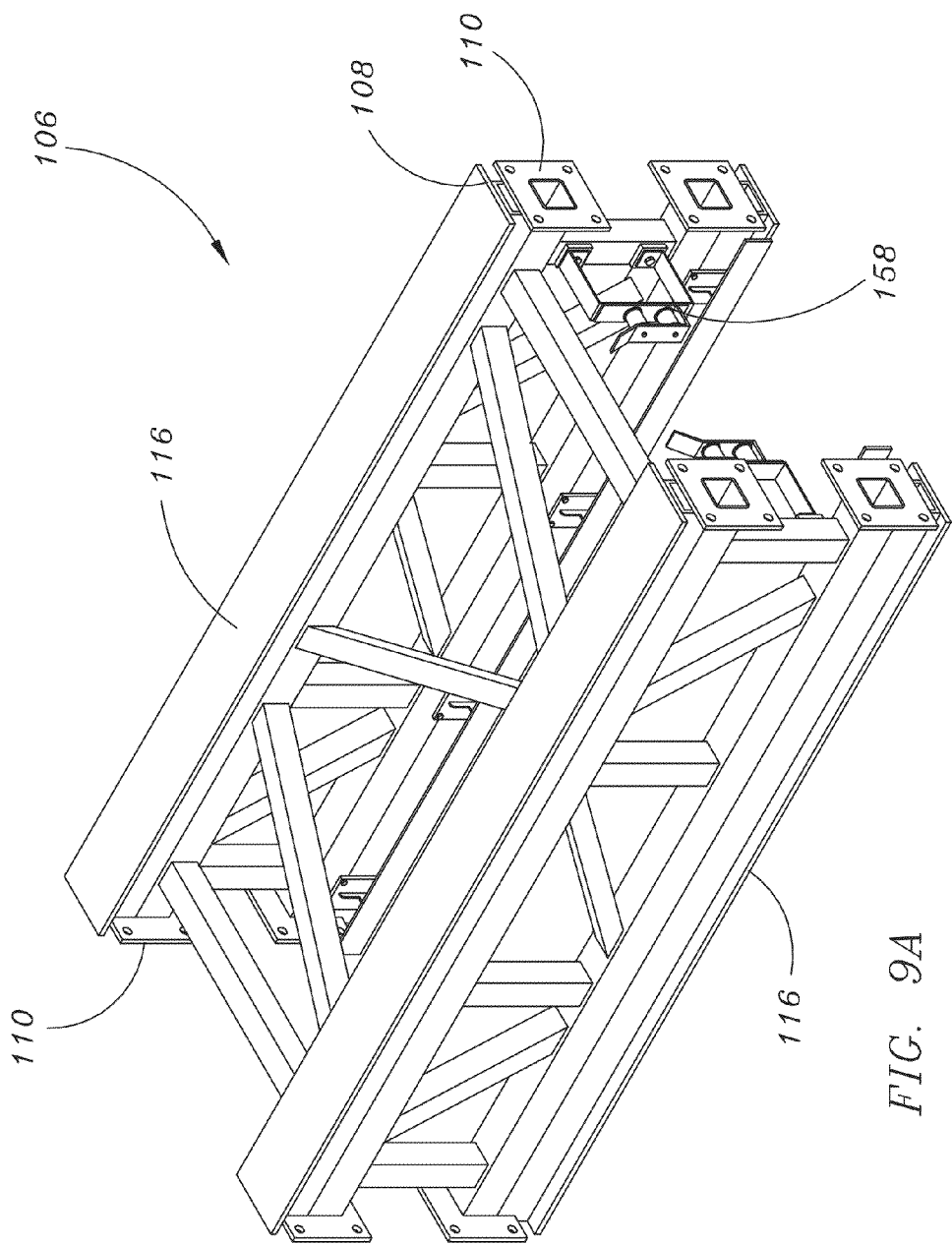
FIG. 9A is a perspective view of a modular frame insert of an embodiment of the present invention.
Figure 9B:
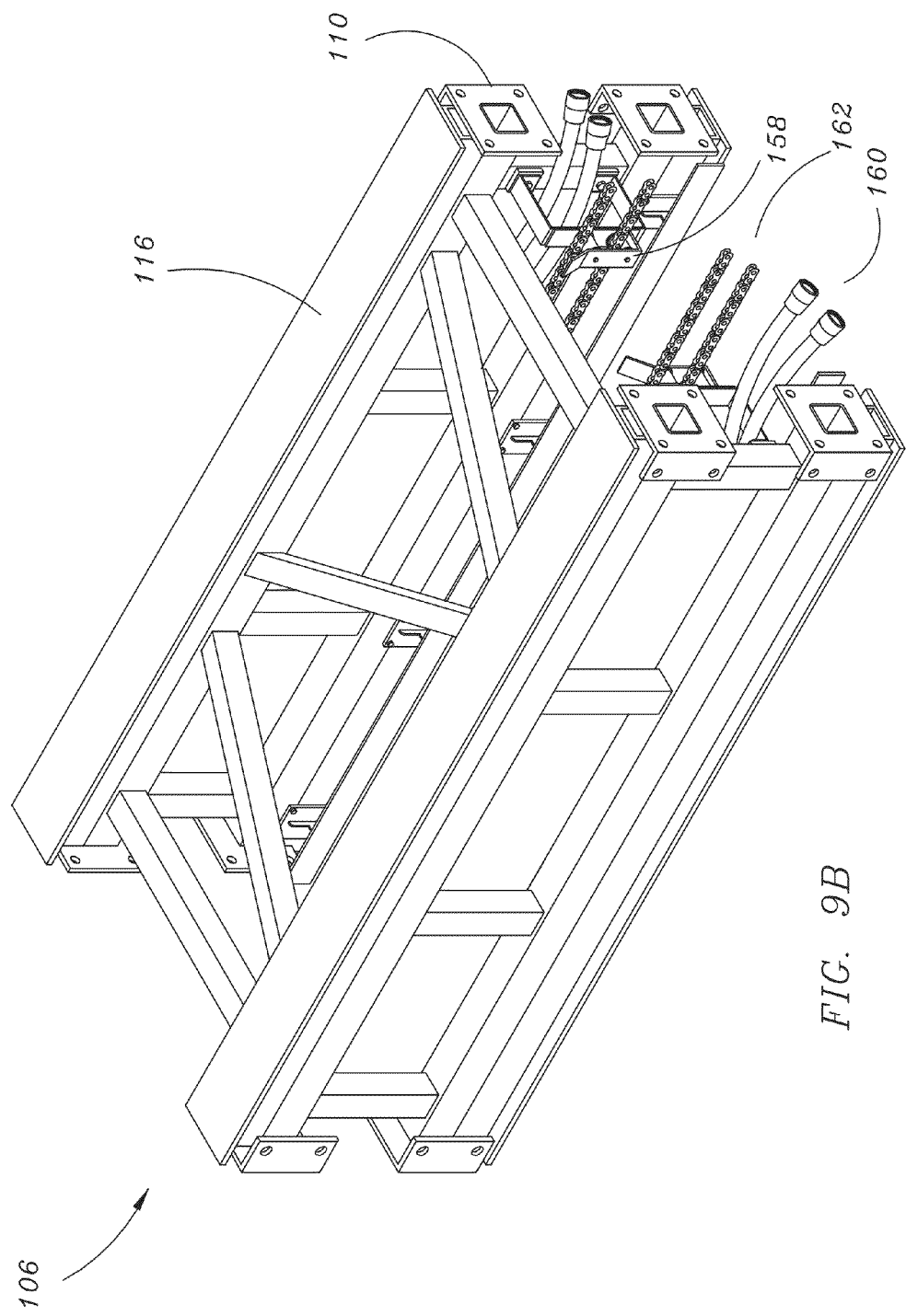
FIG. 9B is a perspective view of a modular frame insert of an embodiment of the present invention.

FIGS. 9A and 9B illustrate an embodiment of frame member 106. Referring to FIG. 9A, in preferred embodiments frame member 106 may include frame mount flanges 110 at both ends as well as a rail system 116 spanning frame member 106 along its top and bottom faces. Frame joint 108 marks the point at which rail system 116 of frame member 106 seamlessly connects with the rail system of an adjacent frame member so that end cars and other accessories may laterally slide along rail system 116 to a desired position. Referring to FIG. 9B, frame member 106 can also include internal guides 158 configured to hold in place hydraulic hoses 160 or other connectors 162 linking accessories or components of system 100. In the event of an operation to extend the width of modular framework 102, for example, extensions to any hydraulic hoses 160 or connectors 162 may be easily threaded through internal guides 158.

Figures 10A, 10B:
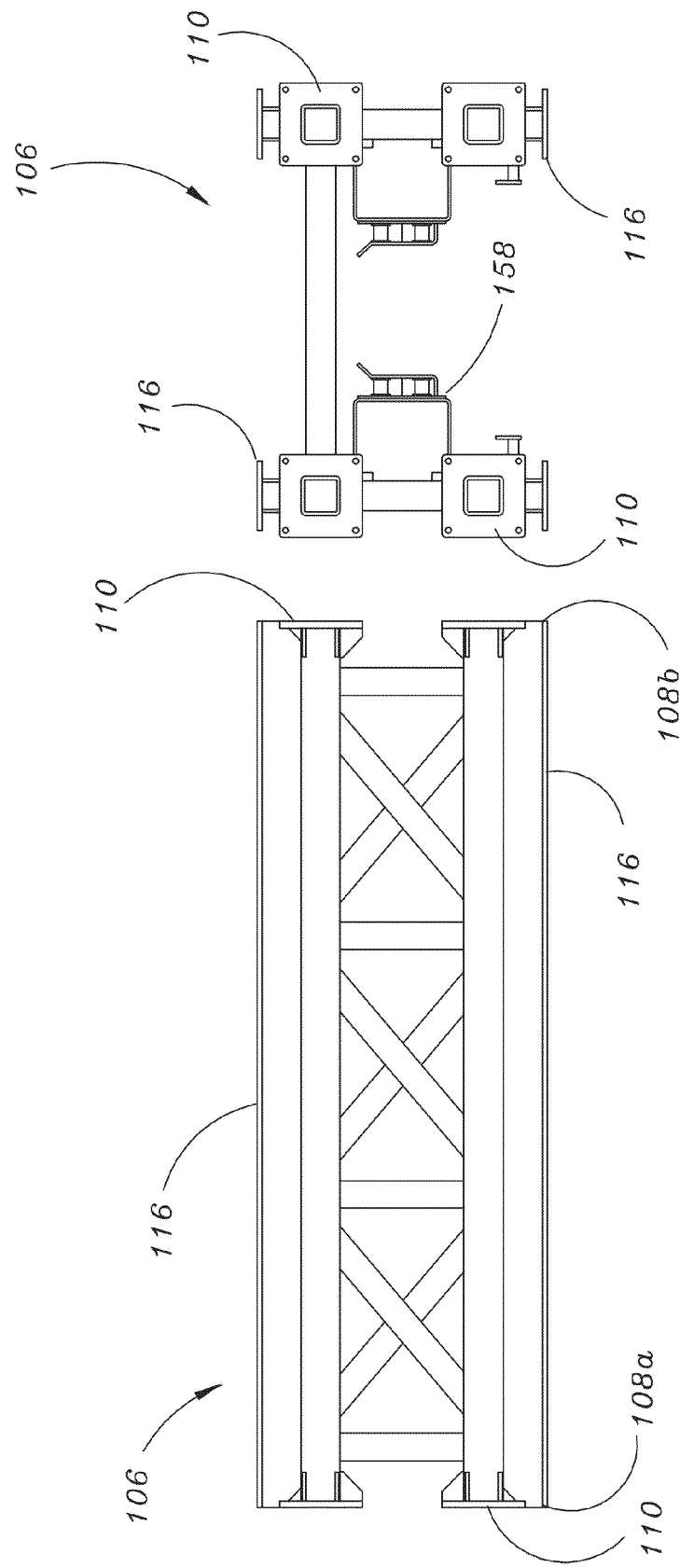
FIG. 10A is a front elevational view of a modular frame insert of an embodiment of the present invention.
FIG. 10B is an end elevational view of a modular frame insert of an embodiment of the present invention.

FIGS. 10A and 10B illustrate an embodiment of frame member 106. Referring to FIG. 10A, frame mount flanges 110 on either side of frame member 106 allow for secure connection of frame member 106 to other frame members or to attachment plate 132. Rail system 116 spans frame member 106 along its top and bottom faces, from frame joint 108*a* to frame joint 108*b*. Referring to FIG. 10B, Interior guides 158 may be configured to secure hydraulic hoses or other connections in place through frame member 106.

Figures 11A, 11B:
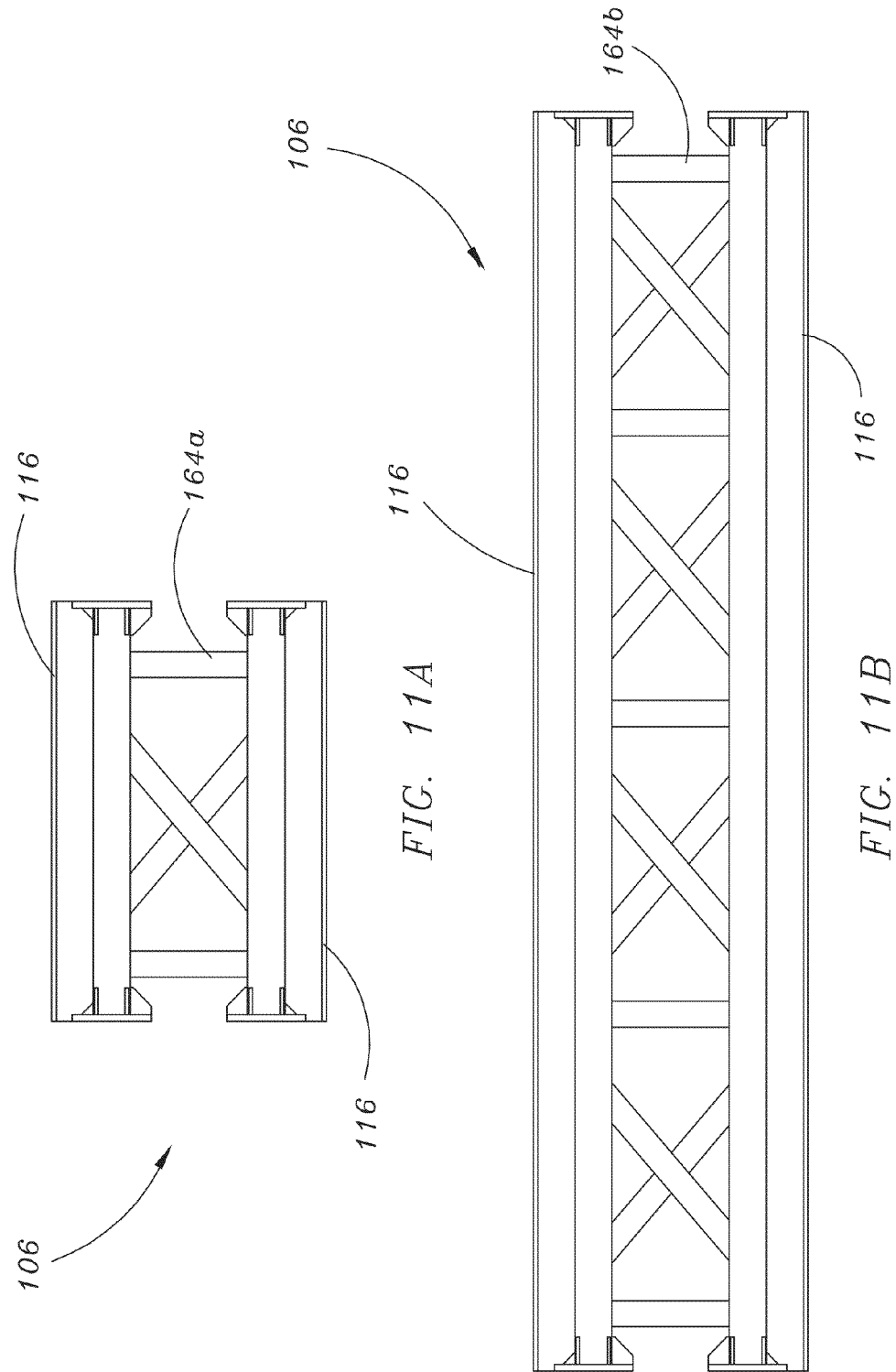
FIG. 11A is a front elevational view of a modular frame insert of an embodiment of the present invention.
FIG. 11B is an end elevational view of a modular frame insert of an embodiment of the present invention.

FIG. 11A illustrates a shorter embodiment of frame member 106 with correspondingly shorter rail system 116 and assembled from shorter frame panels 164*a*, while FIG. 11B illustrates a longer embodiment of frame member 106 with a correspondingly longer rail system 116 and assembled from longer frame panels 164*b*. Embodiments of frame member 106 may be assembled from prefabricated frame panels 164 of any appropriate length as construction needs dictate.

Figure 12:
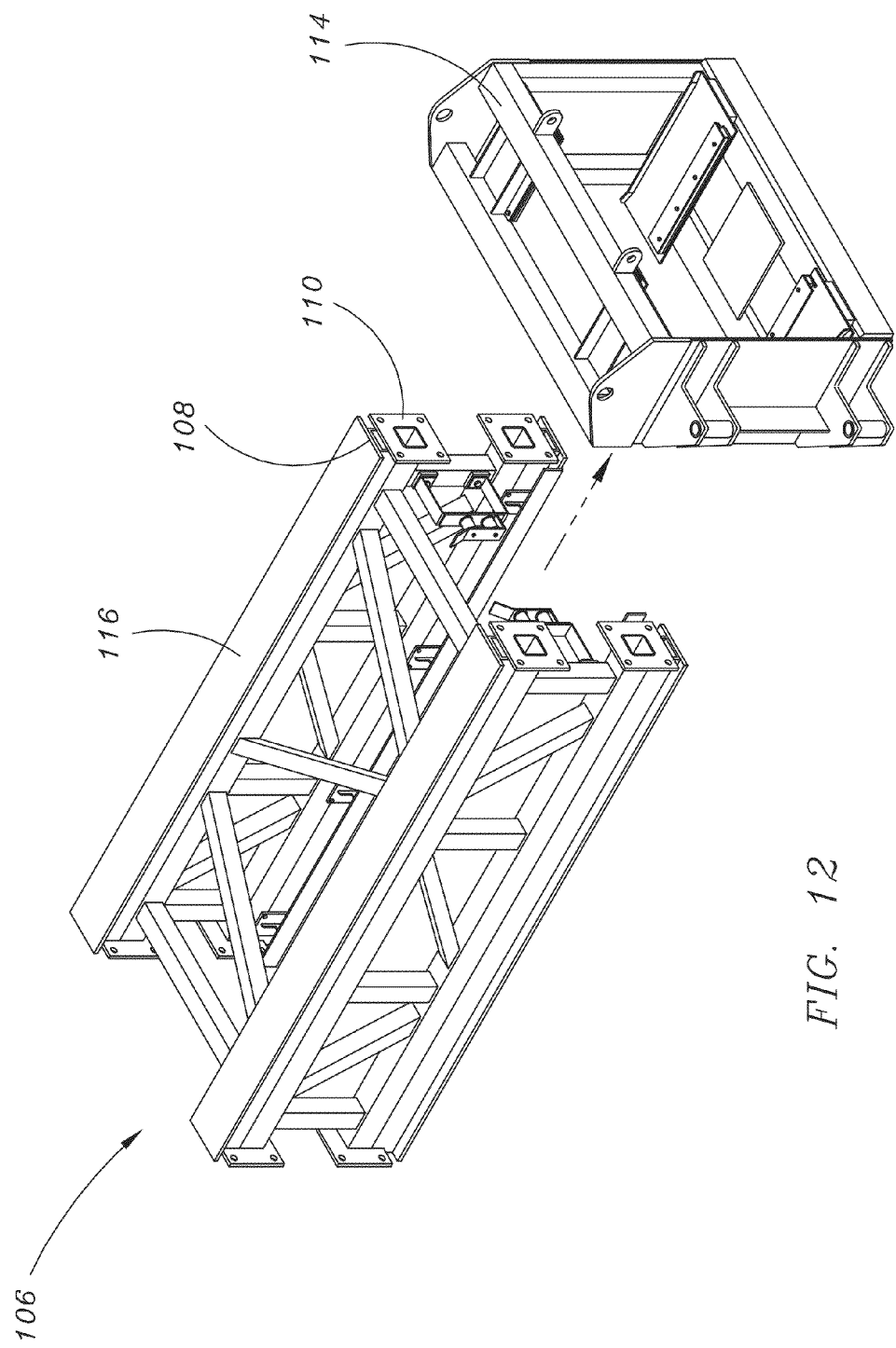
FIG. 12 is a partially exploded perspective view of a modular frame insert and end car assembly of an embodiment of the present invention.

FIG. 12 illustrates an embodiment of frame member 106 detached from end car 114. End car 114 may be configured to slide transversely along the rail system 116 of frame member 106 during width extension or width reduction operations of the present invention. Embodiments of end car 114 may also be configured to detach entirely from frame member 106 as a step of disassembling paving operations system 100 by sliding past frame mount flanges 110 and frame joint 108 at the end of frame member 106.

Figure 13:
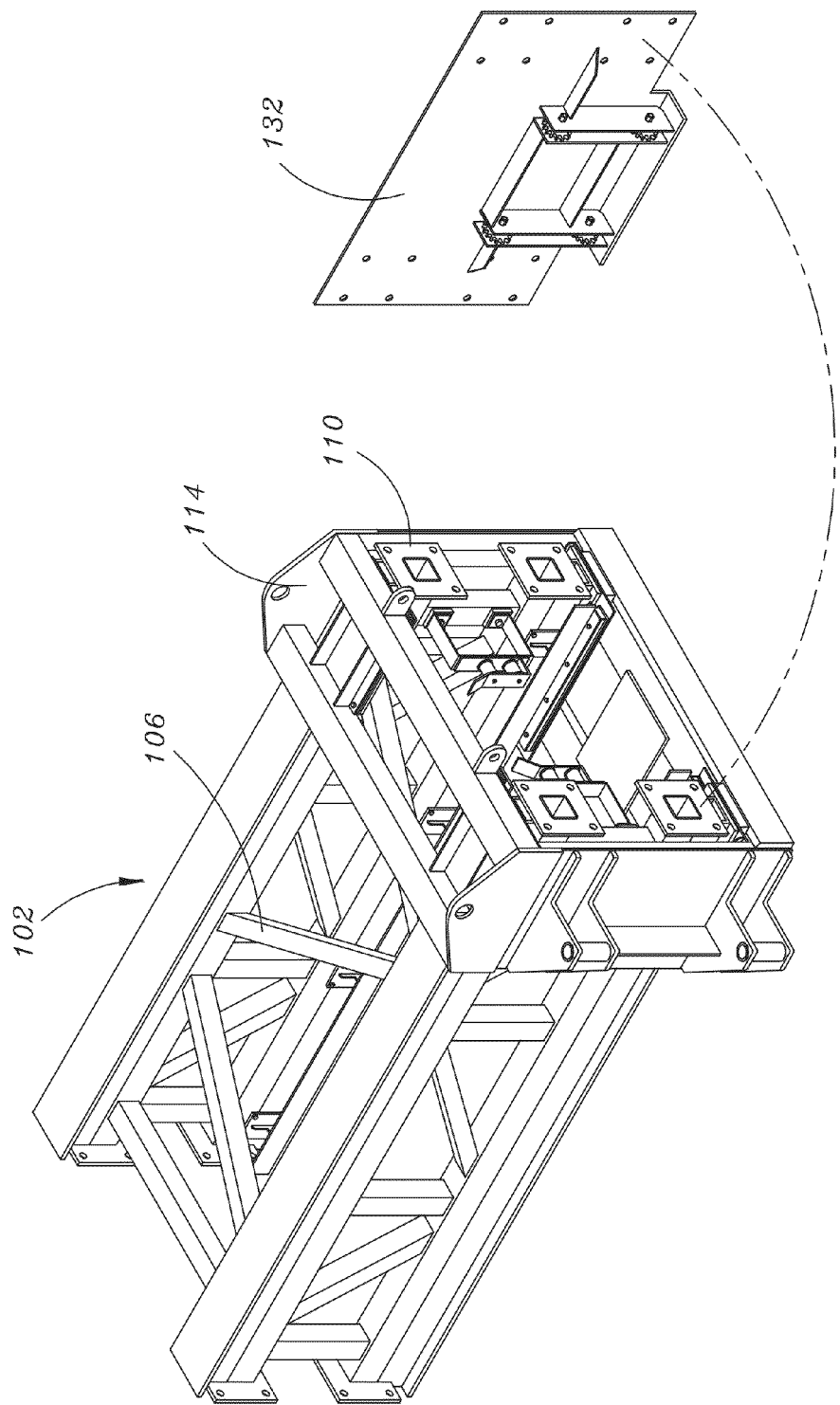
FIG. 13 is a partially exploded perspective view of a modular frame insert, end car assembly, and attachment plate of an embodiment of the present invention.
Figure 14:
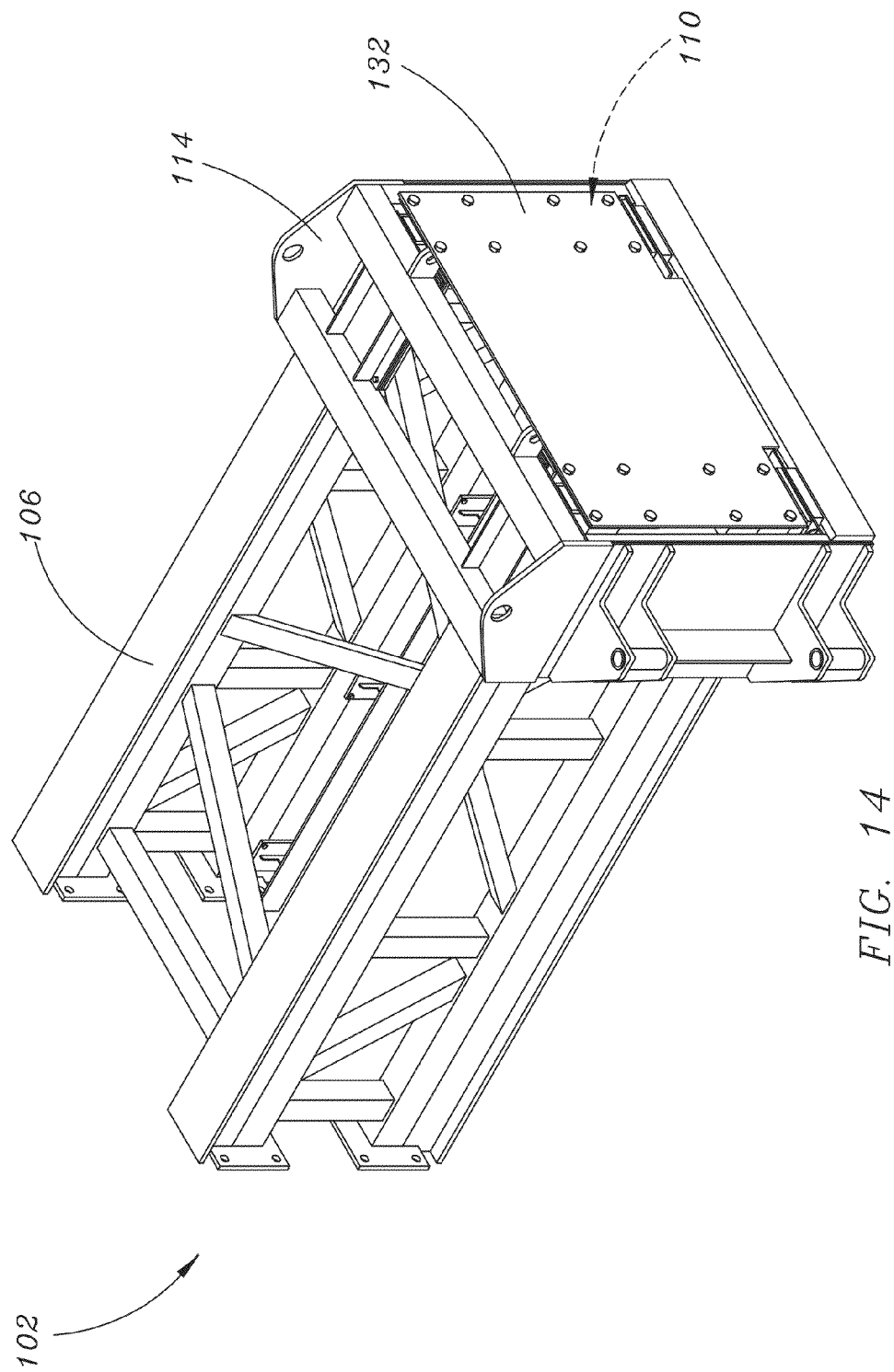
FIG. 14 is a perspective view of a modular frame insert, end car assembly, and attachment plate of an embodiment of the present invention.

FIGS. 13 and 14 illustrate an embodiment of modular framework 102. Referring to FIG. 13, attachment plate 132 may be secured to the end of frame member 106 through the corresponding holes in frame mount flanges 110; in preferred embodiments attachment plate 132 is bolted to frame mount flanges 110. Attachment plate 132 can further be disconnected from frame member 106 as a preliminary step of extending or reducing the width of system 100 by the addition or removal of a frame member 106.

FIG. 14 illustrates an embodiment of modular framework 102 in which attachment plate 132 has been secured to frame member 106 via frame mount flanges 110 (not shown) to hold end car 114 in place. In embodiments, attachment plate 132 is secured to frame member 106 as a final step of extending or reducing the width of system 100 by the addition or reduction of a frame member 106.

Figure 15:
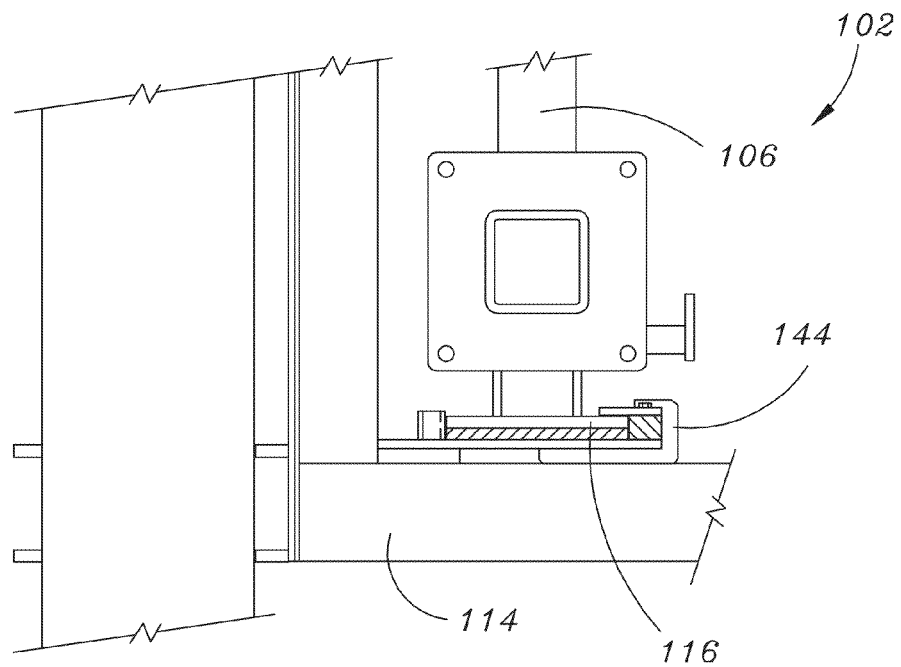
FIG. 15 is an end cross-sectional elevation of the construction and interface with the T-rail engagement assembly of a walking end car of the rail system of an embodiment of the present invention.
Figure 16:
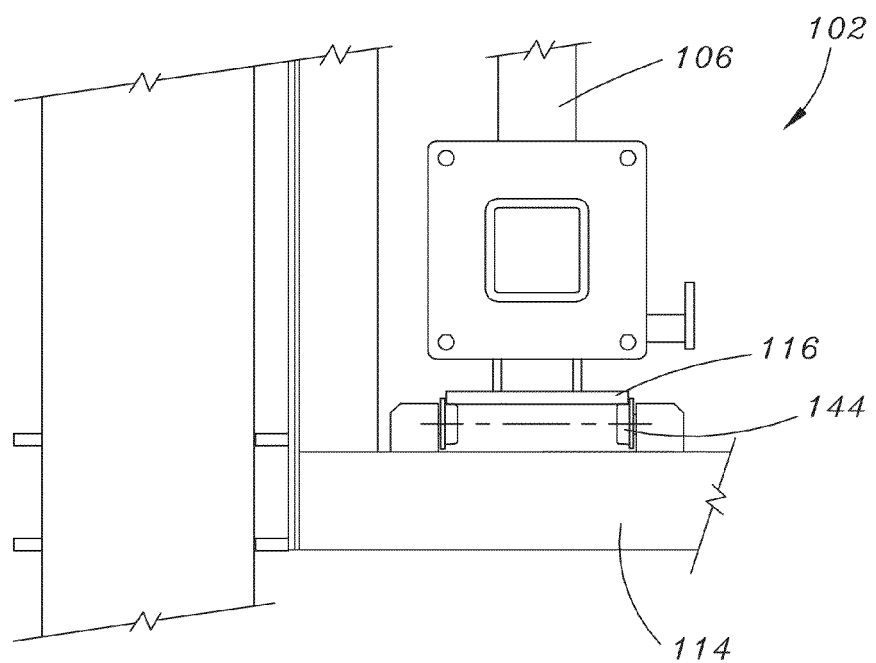
FIG. 16 is an end elevational view of the construction and interface with the T-rail engagement assembly of a walking end car of the rail system of an embodiment of the present invention.
Figure 17:
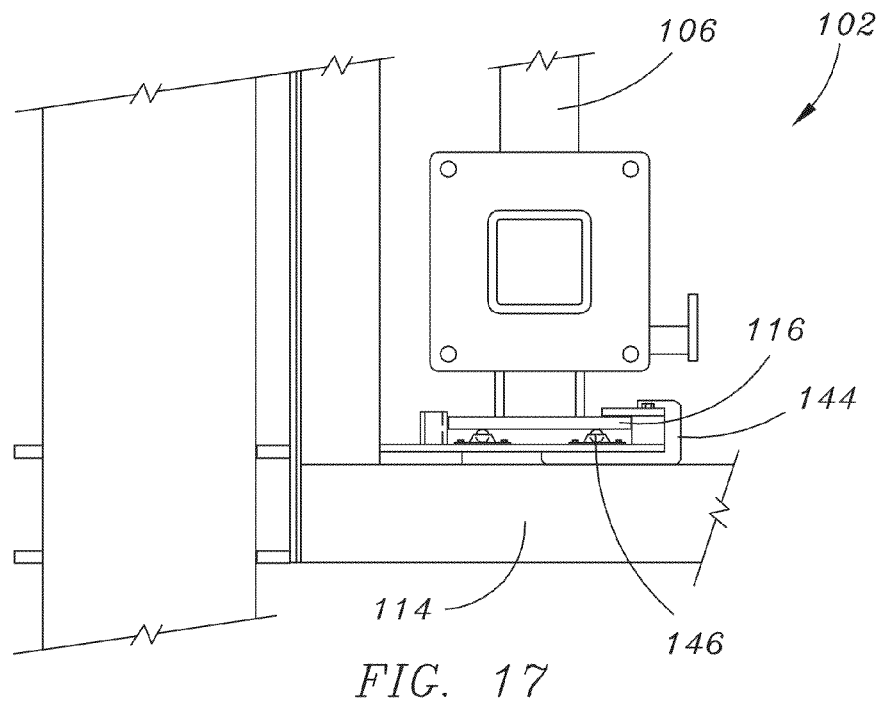
FIG. 17 is an end cross-sectional elevation of the construction and interface with the T-rail engagement bearing assembly of a walking end car of the rail system of an embodiment of the present invention.

FIGS. 15-18 depict embodiments of modular framework 102 in which end car 114 is slidably connected to frame member 106 by a rail system 116. Referring to FIG. 15, in preferred embodiments rail guide 144 of end car 114 secures T-rail 116 in place while allowing end car 114 to slide along the length of T-rail system 116. FIG. 16 illustrates the use of an alternate embodiment of rail guide 144 to accommodate T-rail system 116. FIG. 17 illustrates an embodiment of modular framework 102 wherein rail guide 144 using a series of bearings 146 in contact with T-rail 116 to secure and slidably guide end car 114 along the length of T-rail system 116.

Figure 18:
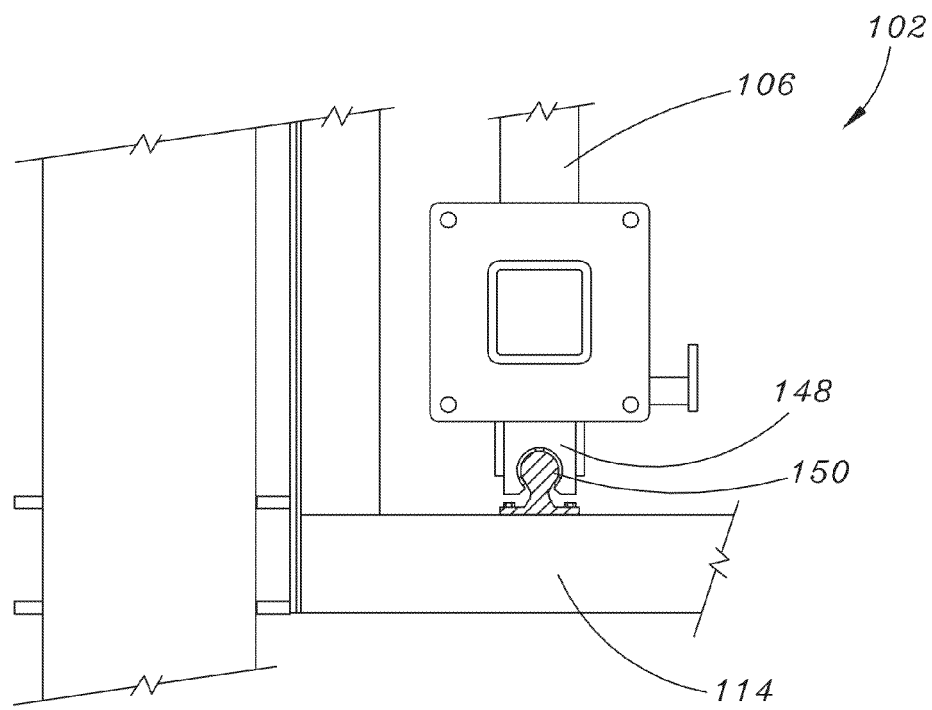
FIG. 18 is an end elevational view of the construction and interface with an alternative rail system of a walking end car of the rail system of an embodiment of the present invention.

In alternative embodiments of modular framework 102, rail system 116 of frame member 106 may not include a T-rail system. Referring to FIG. 18, frame member 106 may include an alternative rail system 148 with a rounded slot, into which a corresponding rounded rail 150 of end car 114 is inserted, allowing end car 114 to slide along the length of alternative rail system 148.

Figure 19:
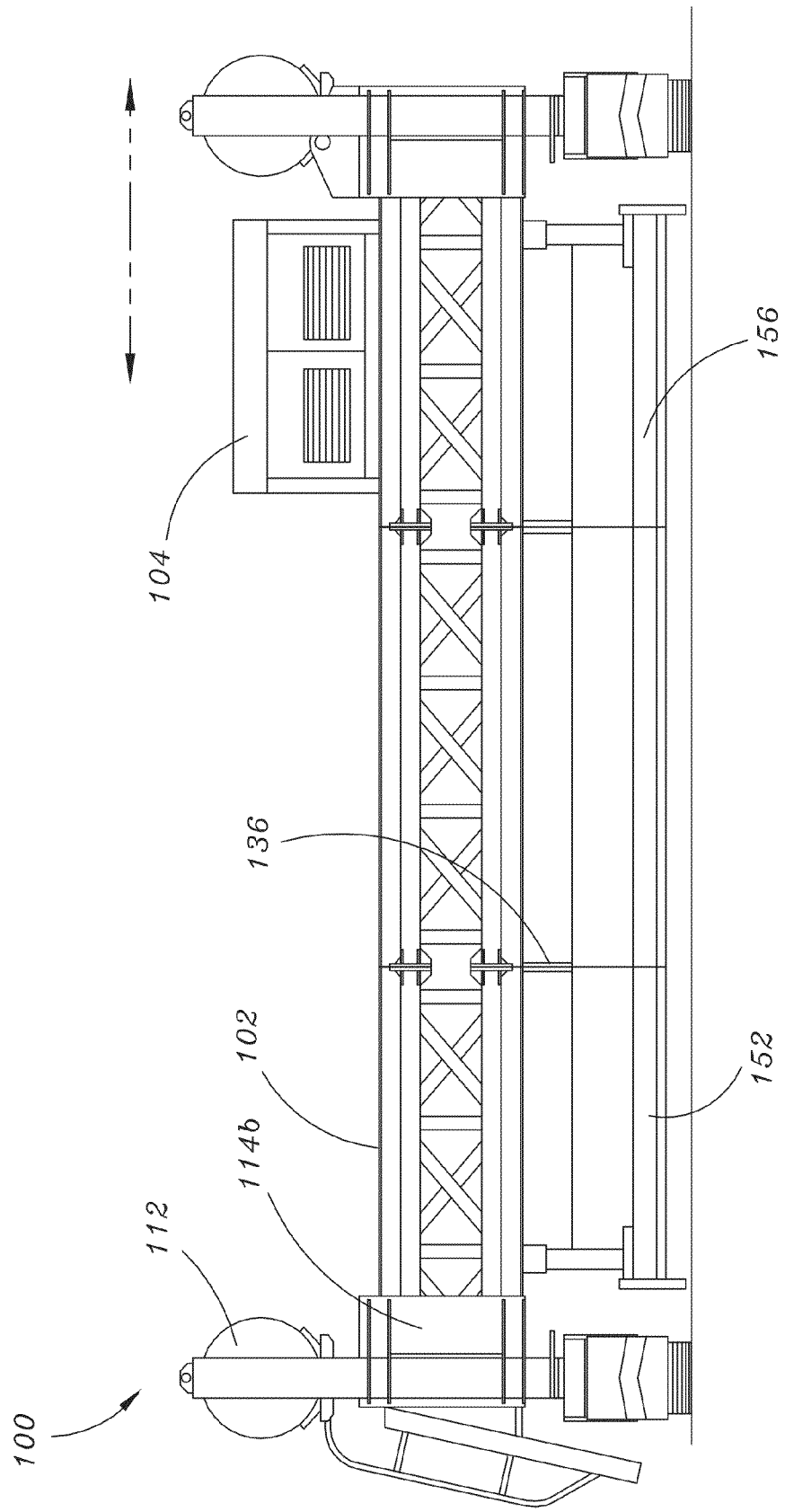
FIG. 19 is a rear elevational view of an embodiment of a spray bar attachment of the present invention.
Figure 20:
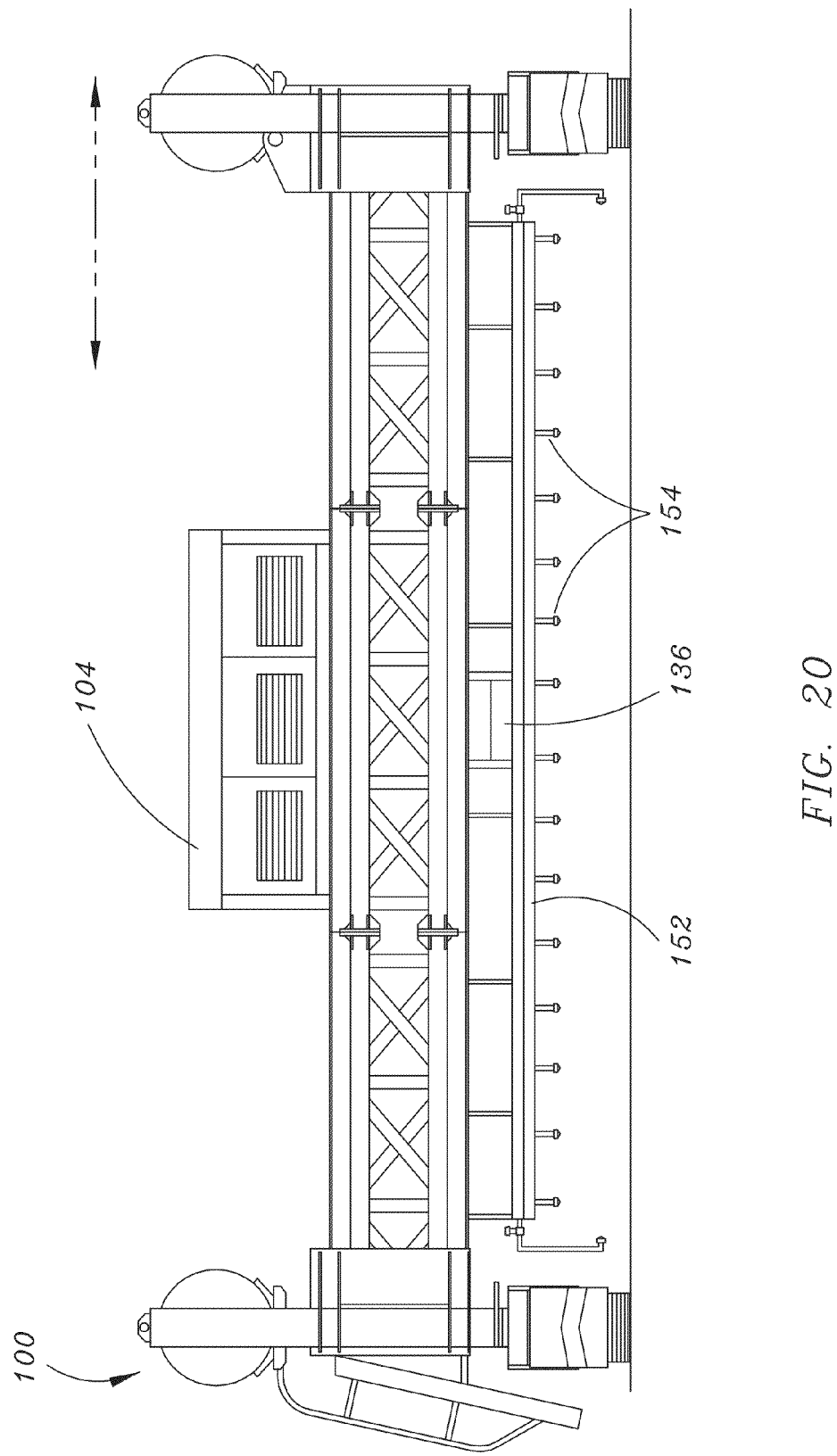
FIG. 20 is a front elevational view of an embodiment of a spray bar attachment of the present invention.

FIG. 19 illustrates a rear view of, and FIG. 20 illustrates a front view of, an embodiment of paving operations system 100 incorporating a spray bar assembly 152 secured to accessory mount 136. Referring to FIG. 19, cure tank 112 may be mounted to end car 114*b* and connected to spray bar assembly 152 for distribution to the work surface; in preferred embodiments, cure tank 112 is constructed of steel and is mounted to walking end car 114*b* opposite engine console 104.

Referring to FIG. 20, in preferred embodiments the control system of system 100 includes a spray control system that regulates the flow through nozzles 154 of spray bar assembly 152 via flow meters linked to the control system, speed sensors mounted to spray bar assembly 152, or in response to user input. Referring to FIG. 19, in some embodiments spray bar assembly 152 includes an aluminum walkway 156 mounted to the rear of modular framework 102. Embodiments of spray bar assembly 152 may fold up when system 100 converts to a transitional configuration. In preferred embodiments, spray bar assembly 152 and a texture rake 134 are the same length, e.g., 7 feet, so that tining and curing may occur simultaneously. Referring to FIG. 20, embodiments of engine console 104 may be configured to slide transversely along, and then mounted to other points on, modular framework 102.

In preferred embodiments, the control system of system 100 includes a tining control system. Embodiments of the tining control system may include acoustic or sonic sensors to track slab elevation so that a texture rake 134 mounted transversely may trace a work surface at a desired depth without the need for a power transition adjuster. The control system of system 100 can control the depth of texture rake 134 through a hydraulic height adjuster of the accessory mount 136. In preferred embodiments, the hydraulic height adjuster can move the texture rake through a vertical range of 12 to 16 inches in response to information received through sensors or user input. The tining control system may also include proximity switches to control the end points of texture rake 134. Embodiments of the tining control system can also include centrally mounted acoustic or sonic sensors for monitoring grade elevation. Grade elevation sensors enable the control system to control the height and orientation of a longitudinally mounted texture rake 134 during pavement tining or crowning operations. Embodiments of the control system may also include a grade control system, a trimming control system, a smoothness indicator control system, or any other control system component configured to control an accessory of system 100.

Figure 21A:
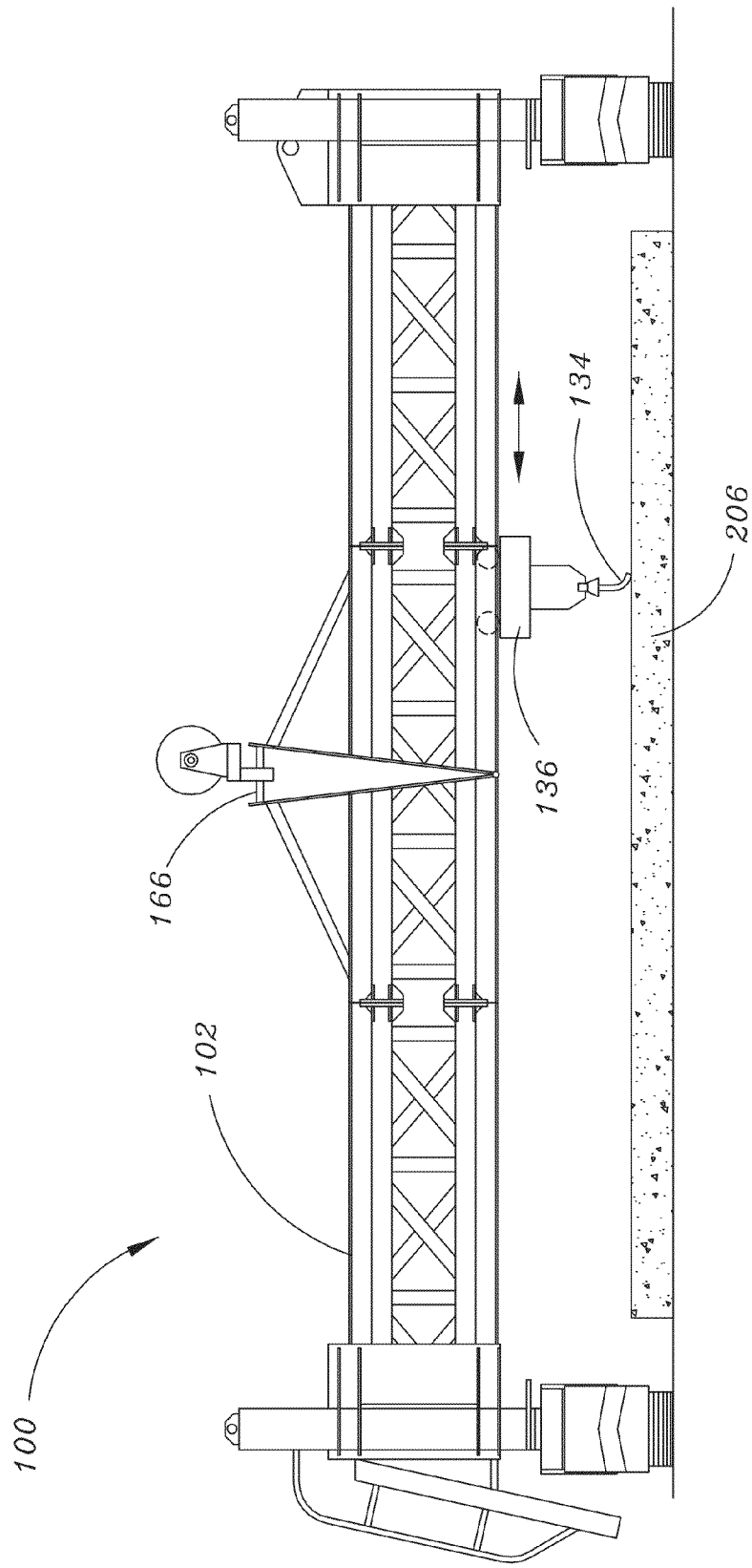
FIG. 21A is a front elevational view of a prior art texturing accessory.
Figure 21B:
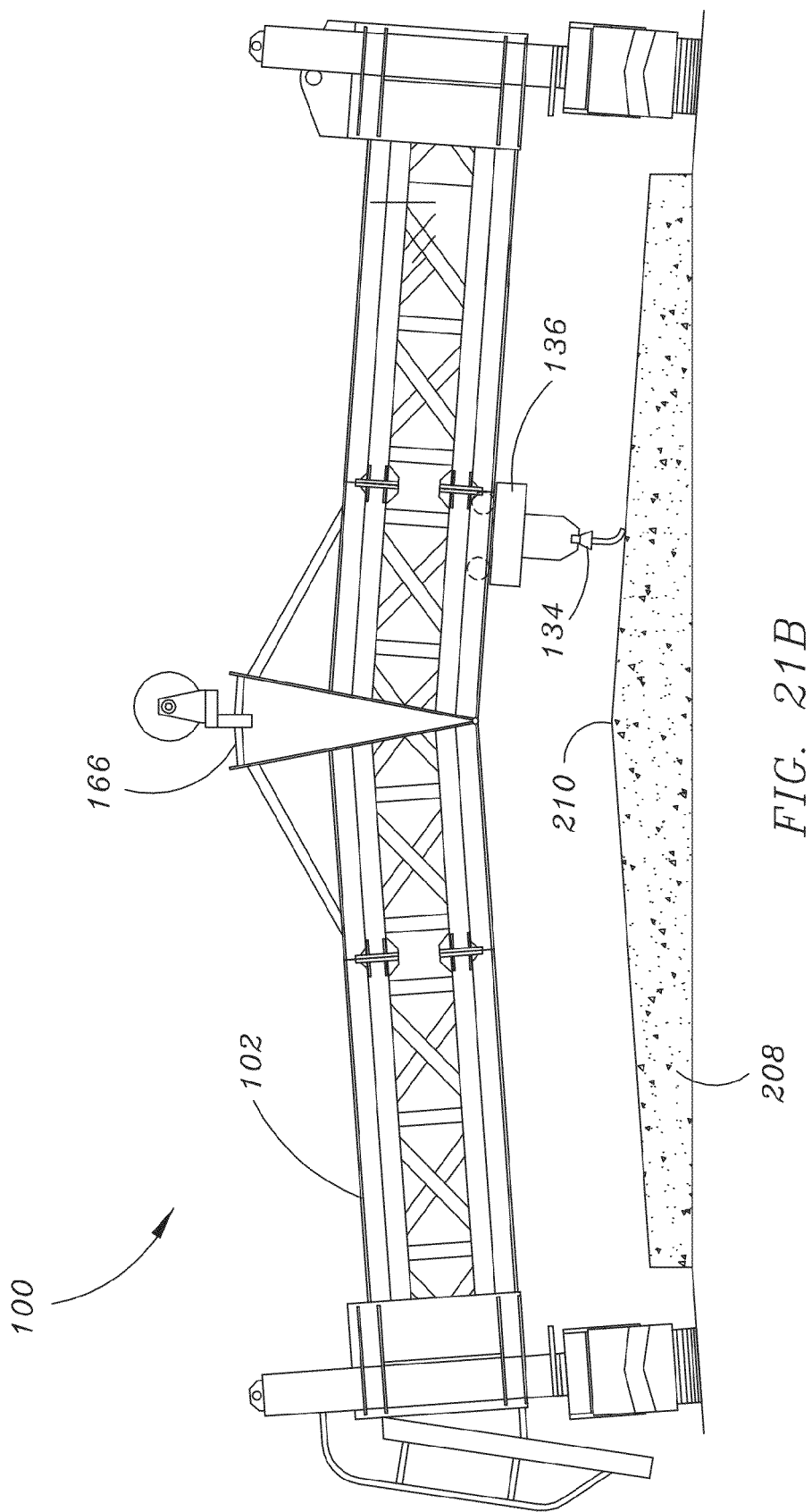
FIG. 21B is a front elevational view of a prior art texturing accessory.

FIGS. 21A-21D illustrate an alternative embodiment of a texturing attachment for a paving operations system 100 of the present invention. Referring to FIG. 21A, system 100 may be fitted with an accessory mount 136 to which a texture rake 134 may be mounted for transverse texturing of a flat surface 206. The control system of system 100 may direct texture rake 134 to move transversely across surface 206, texturing the surface to a desired depth. Referring to FIG. 21B, system 100 may be configured to texture a crowned surface 208. Paved surface 208 may be crowned, i.e., descend in height from a central apex 210, so that water may flow downward away from the apex 210 and efficiently drain surface 208. Power transition adjuster 166 may therefore be mounted to system 100 and configured to crown the modular framework 102 of system 100 to match crowned surface 208, so that texture rake 134 connected to accessory mount 136 may transversely move across and texture surface 208 to a uniform desired depth.

Figure 21C:
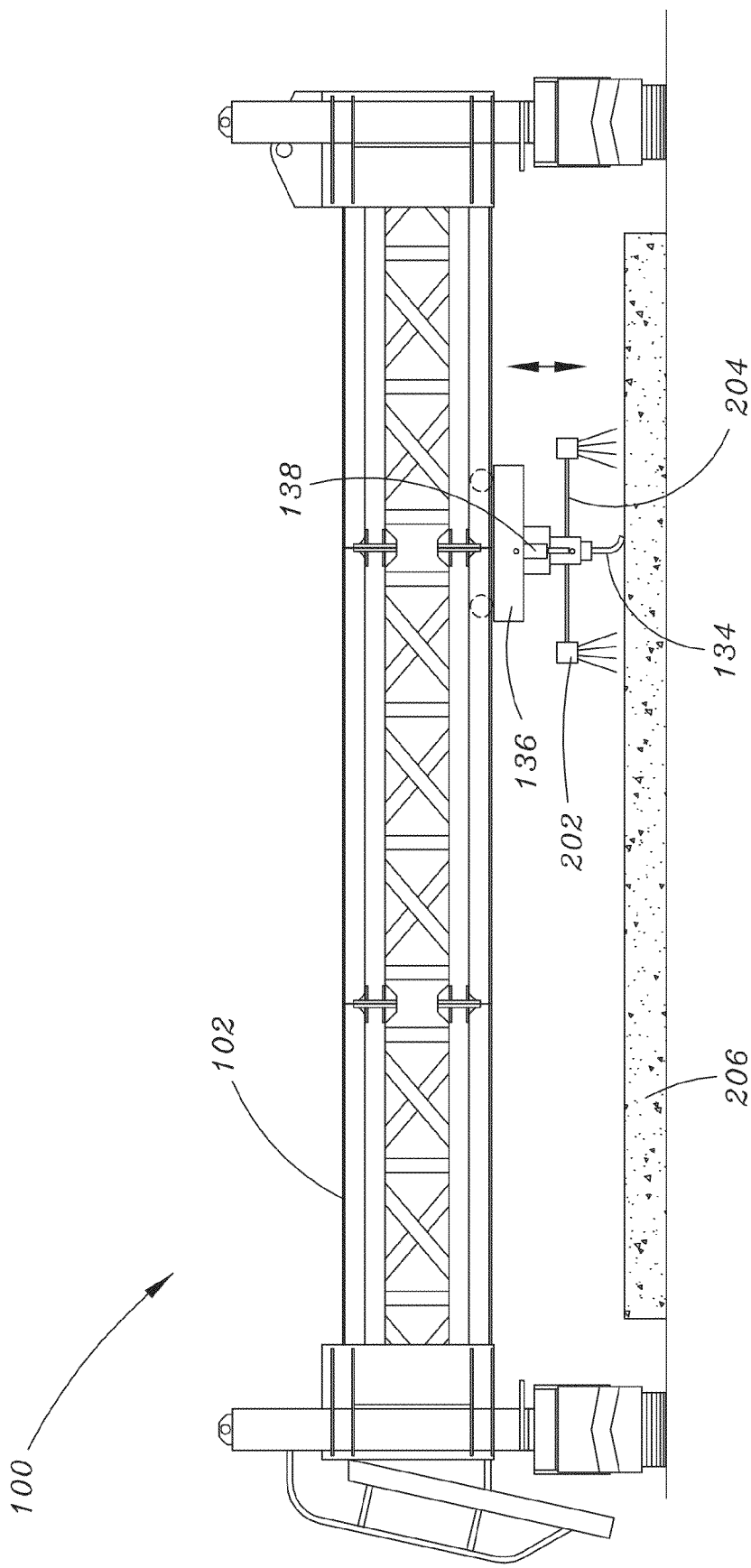
FIG. 21C is a front elevational view of an alternative embodiment of a texturing attachment of the present invention.
Figure 21D:
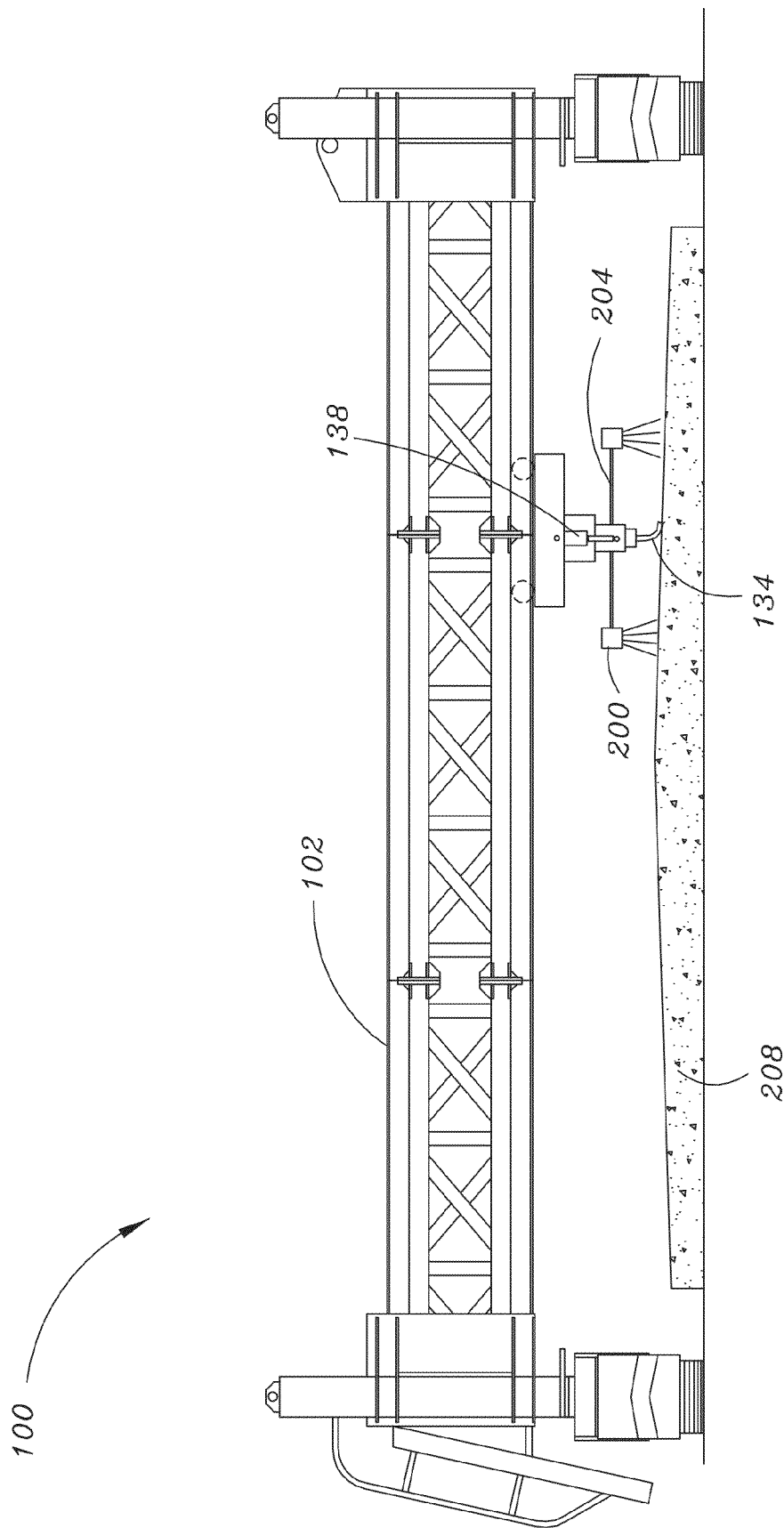
FIG. 21D is a front elevational view of an alternative embodiment of a texturing attachment of the present invention.

FIG. 21C illustrates an alternative embodiment of paving operations system 100. In preferred embodiments, system 100 may include a hydraulic height adjuster 138 and sensor array 204 mounted to accessory mount 136. Sensor array 204 may include at least one slab elevation sensor 202 transversely mounted to texture rake 134 and configured to return data on the elevation of flat surface 206 to the control system. FIG. 21D illustrates an alternative embodiment of paving operations system 100 texturing a crowned surface 208. Rather than utilize a power transition adjuster, system 100 may reduce complexity by mounting hydraulic height adjuster 138 and sensor array 204 to accessory mount 136 in addition to texture rake 134. As accessory mount proceeds transversely across crowned surface 208, transversely mounted slab elevation sensors 200 provide data to the control system which in turn controls hydraulic height adjuster 138. In preferred embodiments, hydraulic height adjuster 138 can raise or lower accessory mount 136 (and texture rake 134) through a continuous vertical range of 12 to 16 inches, allowing texture rake 134 to transversely texture crowned surface 208 at a uniform or desired depth.

Figure 22A:
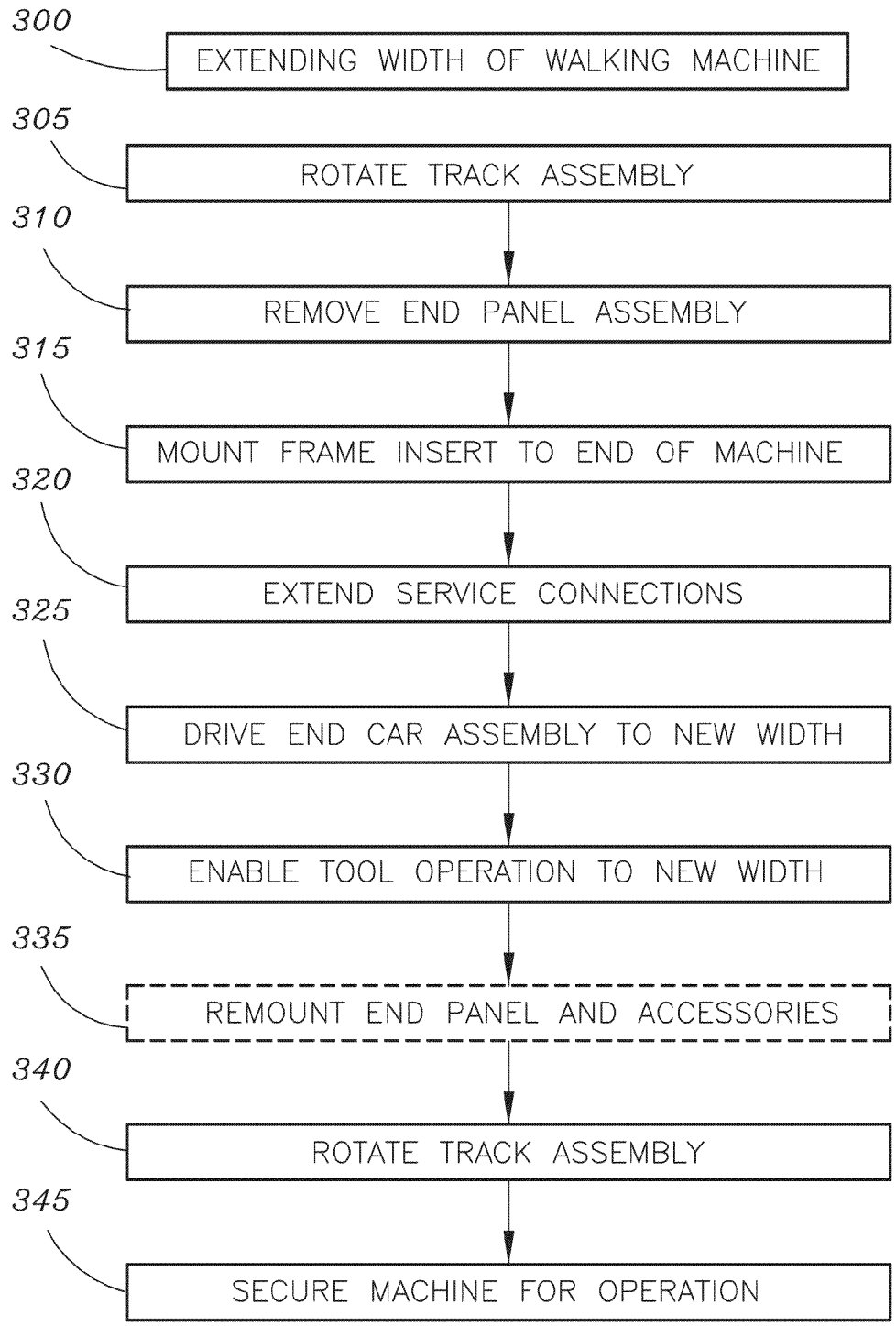
FIG. 22A is a flow diagram of an operation extending transverse width of an embodiment of the present invention.

FIG. 22A illustrates a method 300 for extending the width of an embodiment of paving operations system 100. At step 305 of method 300, steering assembly 124 articulates leg pivots 122 to rotate front and rear steerable crawlers 120 connected to walking end car 114b to a transport orientation parallel to modular framework 102, transitioning system 100 to transitional configuration. At step 310, attachment panel 132 is removed from the frame member 106b farthest from drive end car 114a. At step 315, an additional frame insert 106c is mounted to frame insert 106b via frame mount flanges 110. At step 320, hydraulic hoses 160 and other service connections 162 are extended across the length of additional frame member 106c. At step 325, walking end car 114b is driven along rail system 116 of additional frame member 106c to a position substantially flush with frame mount flanges 110 at the outer end (i.e., farthest from drive end car 114a) of additional frame member 106c. At step 330, operation of any tools and components is enabled for the new extended width of modular framework 102. At step 335, attachment panel 132 and any accessories 112 are mounted to additional frame member 106c. At step 340, steering assembly 124 articulates leg pivots 122 to rotate front and rear steerable crawlers 120 connected to walking end car 114b to an operating orientation perpendicular to the width of modular framework 102, transitioning system 100 to an operational/paving configuration. Finally, at step 345, paving operations system 100 is secured for operation.

Figure 22B:
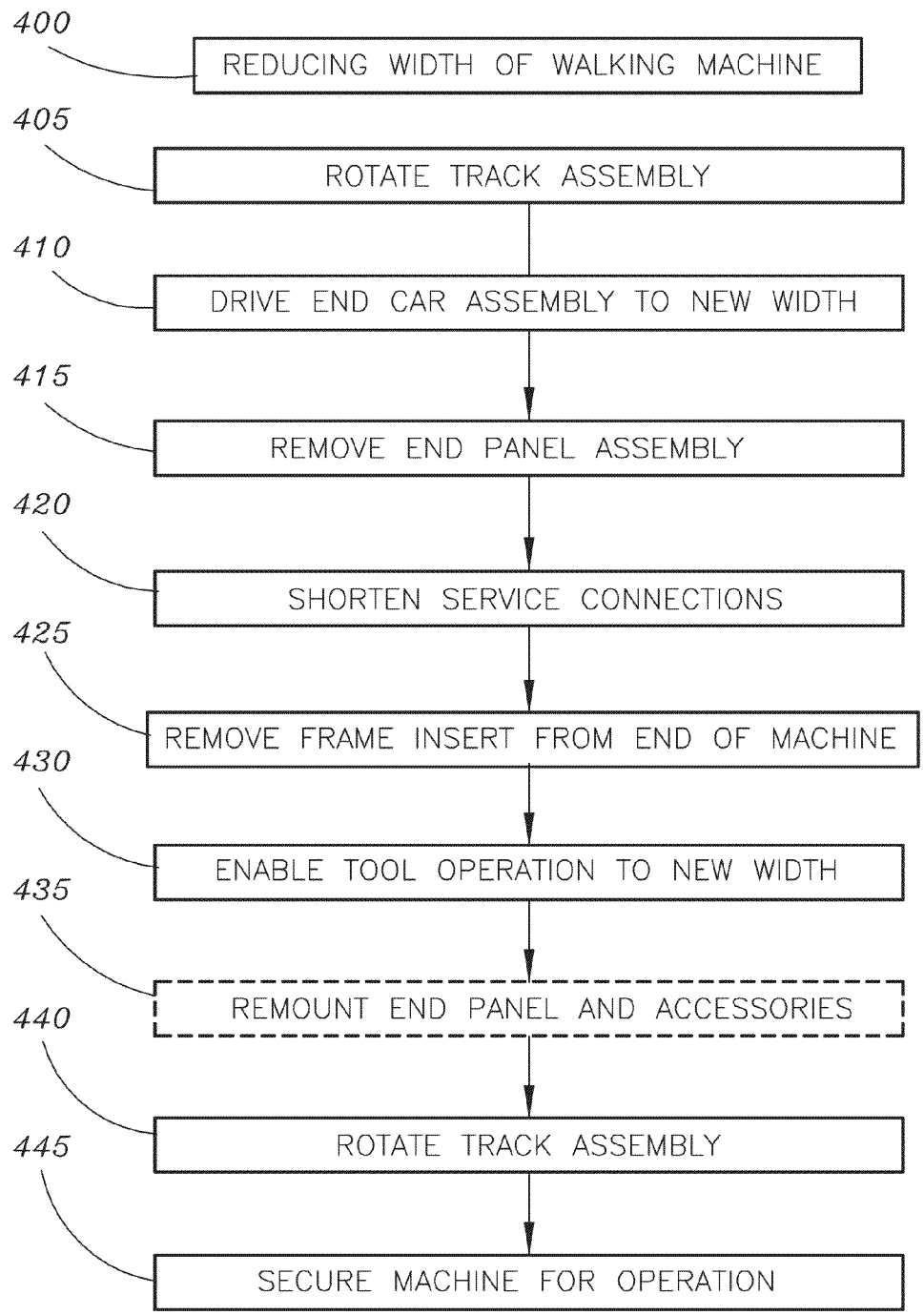
FIG. 22B is a flow diagram of an operation reducing transverse width of an embodiment of the present invention.

FIG. 22B illustrates a method 400 for reducing the width of an embodiment of paving operations system 100. At step 405 of method 400, steering assembly 124 articulates leg pivots 122 to rotate front and rear steerable crawlers 120 connected to walking end car 114b to a transport orientation parallel to the transverse width of modular framework 102, transitioning system 100 to transitional configuration. At step 410, walking end car 114b is driven along outermost frame member 106c to a position substantially flush with frame mount flanges 110 at the outer end of penultimate frame member 106b. At step 415, attachment plate 132 is removed from outer frame member 106c. At step 420, hydraulic hoses 160 and other service connections 162 are shortened to penultimate frame member 106b. At step 425, outermost frame insert 106c is detached from modular framework 102. At step 430, operation of any tools and components is enabled for the new reduced width of modular framework 102. At step 435, attachment panel 132 and any accessories 112 are mounted to new outermost frame member 106b. At step 440, steering assembly 124 articulates leg pivots 122 to rotate front and rear steerable crawlers 120 connected to walking end car 114b to an operational orientation perpendicular to the width of modular framework 102, transitioning system 100 to operational/paving configuration. Finally, at step 445, paving operations system 100 is secured for operation.

Figure 23A:
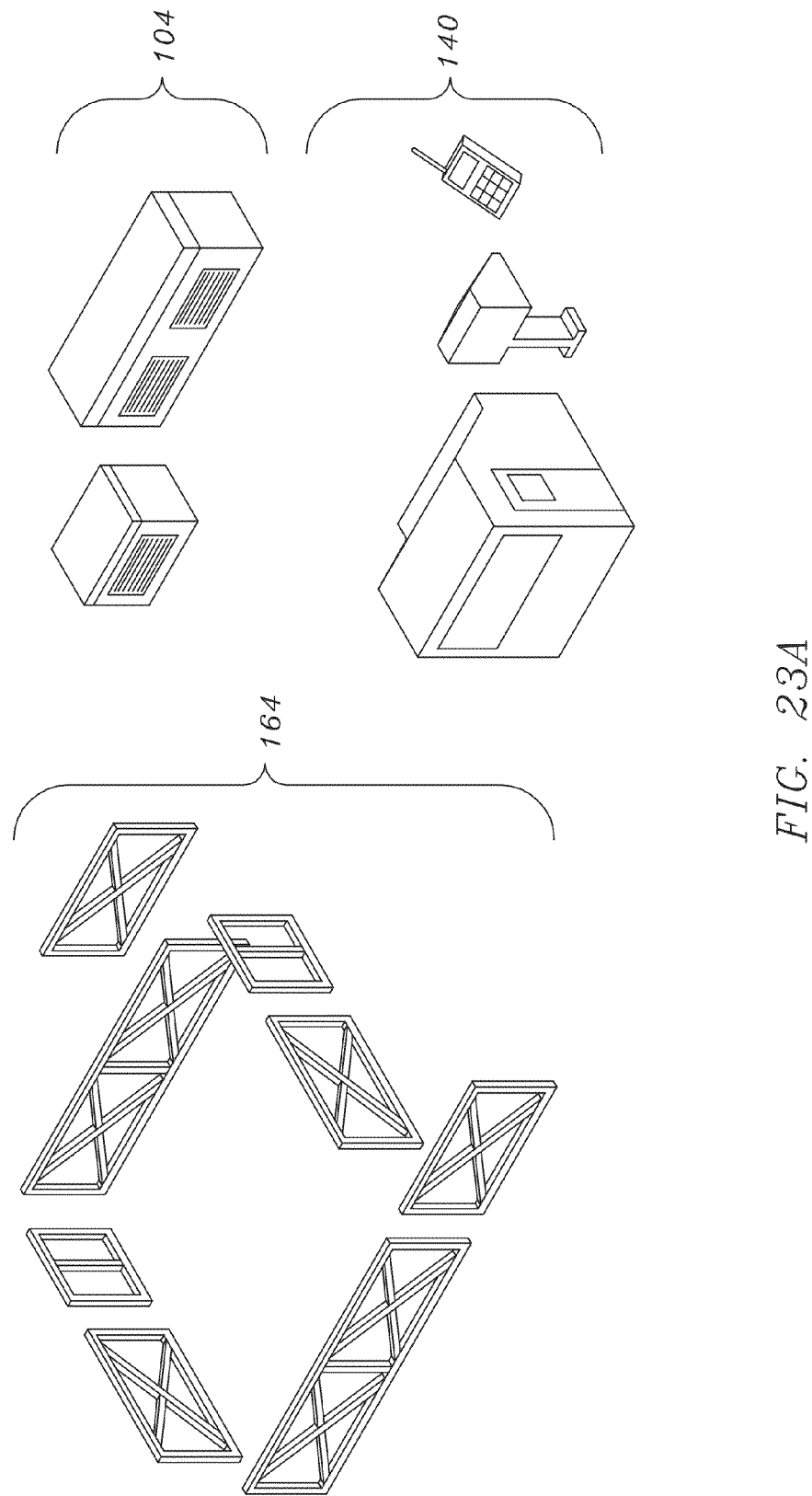
FIG. 23A is a diagrammatic perspective view of the components and accessories of an embodiment of a paving operations system of the present invention.

FIGS. 23A, 23B, 23C, and 23D illustrate modular components and accessories 170 of an embodiment of paving operations system 100. In some embodiments, paving operations system 100 may be modularly manufactured or modularly configured in the field from a selection of prefabricated components to maximize the versatility and functionality of a single base apparatus. Referring to FIG. 23A, accessories 170 may include individual frame panels 164 (from which frame members 106 may be assembled) of various lengths and levels of interior support. Engine consoles 104 may include gasoline, diesel, or electric power sources of various sizes and power ratings. Operator consoles 140 may include standard control stations, portable control consoles mountable to any part of the modular framework, and remote control units.

Figure 23B:
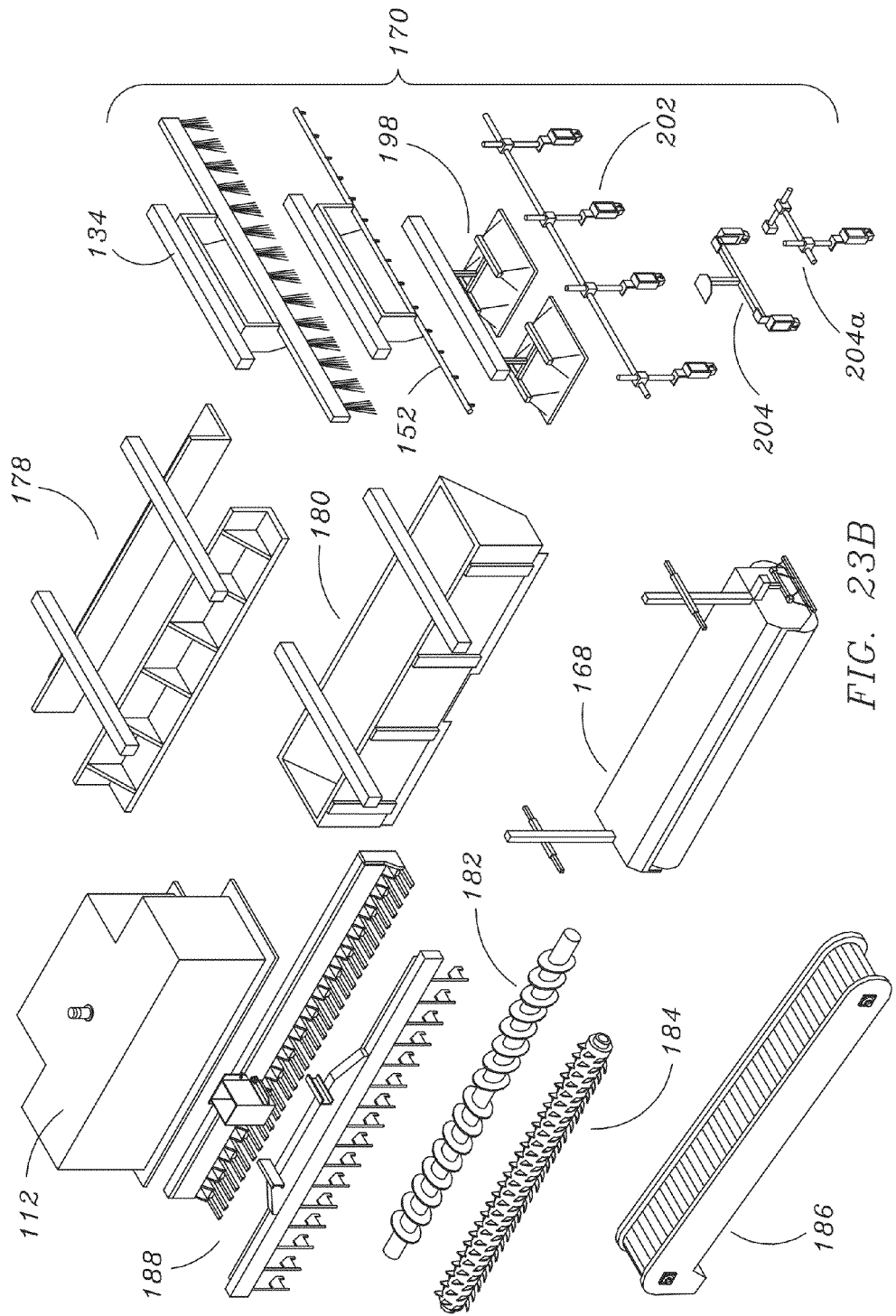
FIG. 23B is a diagrammatic perspective view of the components and accessories of an embodiment of a paving operations system of the present invention.

Referring to FIG. 23B, accessories 170 attachable to accessory mount 136 or modular framework 102 may include accessory pod/cure tank 112, longitudinal or transverse texture rakes 134, spray bar assemblies 152, slipformers 178, transverse saw/bridge deck finishers 168, paving pans 180, spreading augers 182, trimmer wheels 184, placer conveyors 186, dowel bar inserters 188, finishing pans 198, individual sensors 202, or arrays 204 of multiple sensors. Sensor arrays 204 may be mounted transversely (for slab elevation tracking in crowning operations) or longitudinally (for grade elevation). Sensor arrays may further include single adjustable spot sensors 204a mounted to the undercarriage or to another accessory. Individual sensors 202 may be mounted to another accessory or to system 100 in order to return data associated with a geographic reference of system 100, a position relative to system 100, the position of a particular tool or accessory, a work surface position, or a work file position.

Figure 23C:
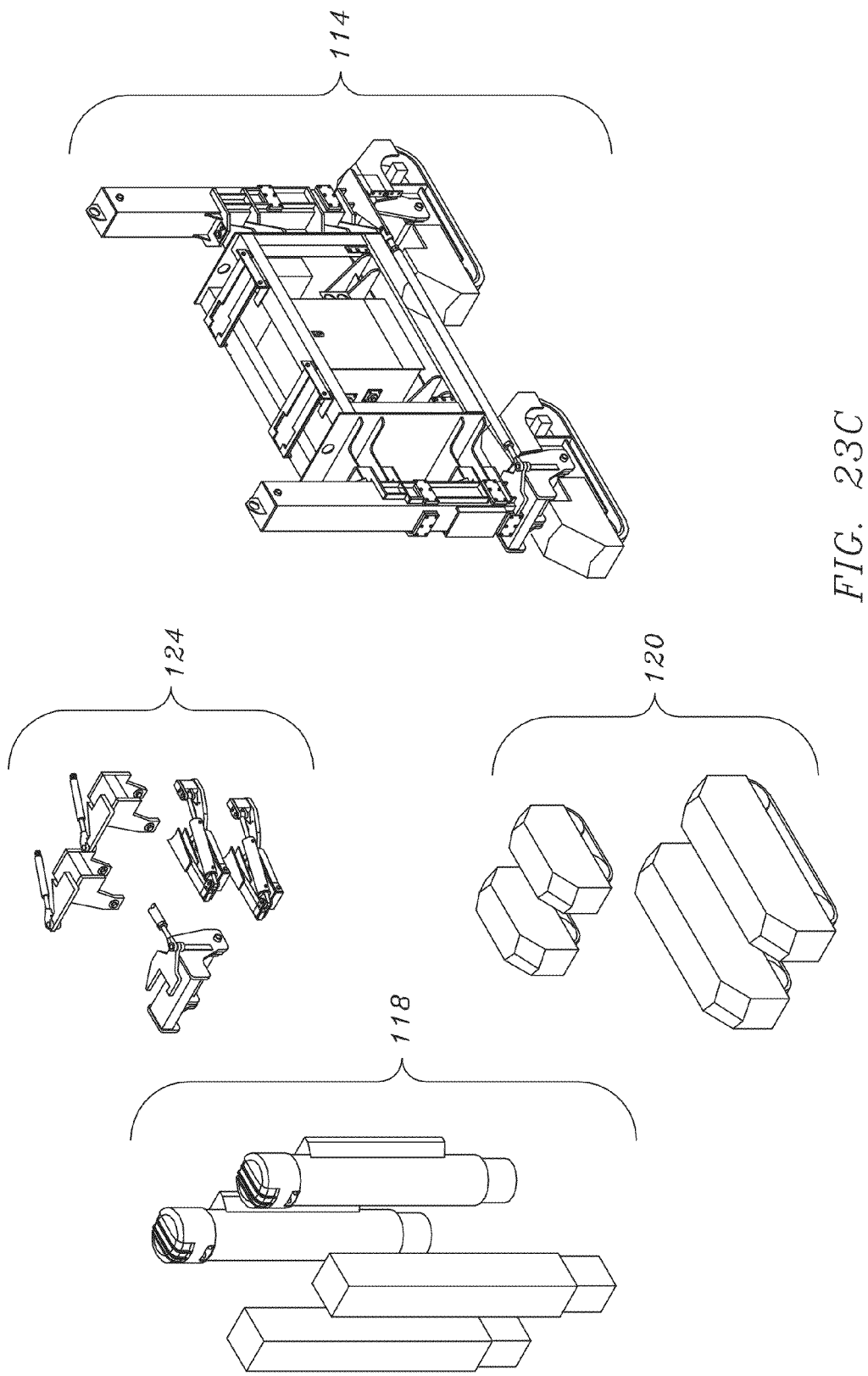
FIG. 23C is a diagrammatic perspective view of the components and accessories of an embodiment of a paving operations system of the present invention.

Referring to FIG. 23C, steerable crawlers 120 may include tracks 130 of various sizes. Steering assemblies 124 may include single-cylinder, multiple-cylinder, and smart-cylinder leg pivots and assemblies, yoke/pin assemblies, and combinations of steering cylinders and tie rods. Adjustable legs 118 may include legs capable of raising and lowering the vertical height of modular framework 102 via hydraulic, electronic, and other means. End cars 114 may include combinations of end frame structures, adjustable legs 118, steerable crawlers 120, and steering assemblies 124.

Figure 23D:
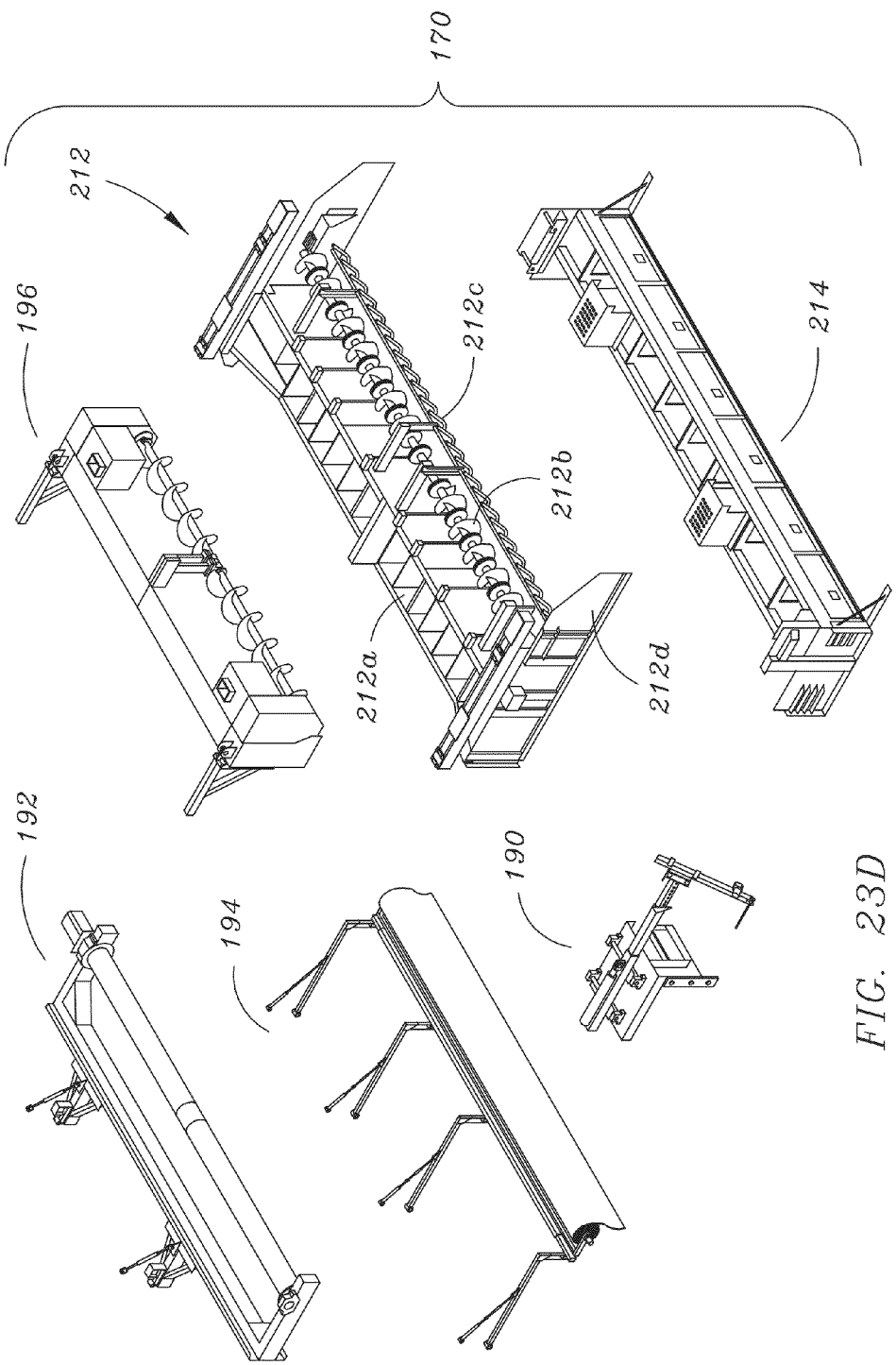
FIG. 23D is a diagrammatic perspective view of the components and accessories of an embodiment of a paving operations system of the present invention.

Referring to FIG. 23D, further accessories attachable to accessory mount 136 or otherwise configurable to paving operations system 100 may include side bar inserters 190, poly rollers 192, burlap drags 194, auger strike-offs 196, auger strike-off assemblies 212 (incorporating slipformers 212a, spreader 212b, vibrating rods 212c, and sideforms 212d), and IDBI screeds 214.

Figure 24:
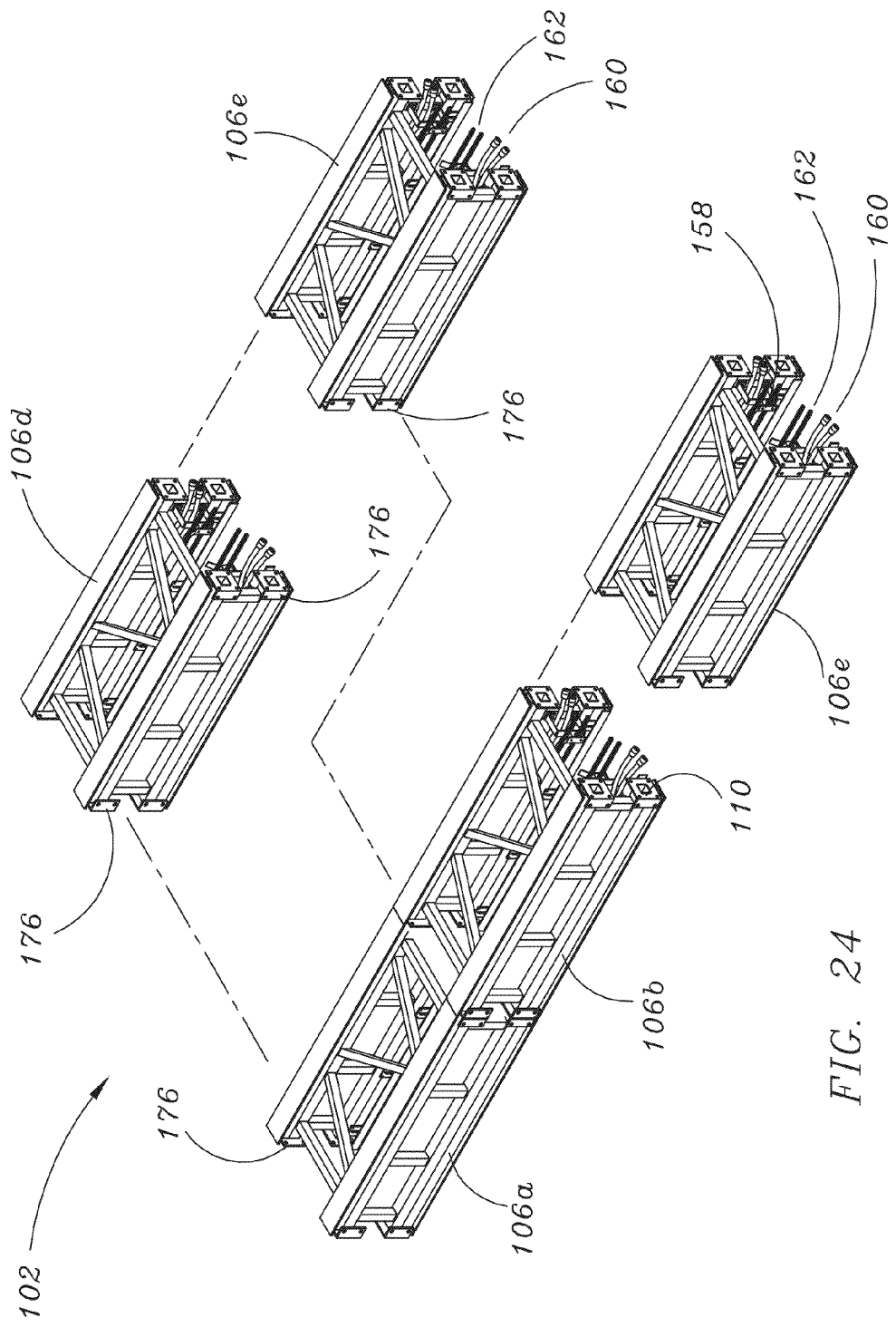
FIG. 24 is a perspective view of an alternative embodiment of the modular framework of the present invention.

In some embodiments, paving operations system 100 may require a more substantial modular framework 102 due to the need for added accessories or increased stability. FIG. 24 illustrates a dual-frame embodiment of modular framework 102 incorporating two rows of frame members 106. Frame member 106c may be mounted longitudinally to frame member 106b via frame mount flanges 110 to extend the width of modular framework 102. In alternative embodiments, modular framework 102 may incorporate combination frame mount flanges 176, allowing frame members 106d and 106e to be mounted transversely to frame members 106a and 106b and longitudinally to each other, extending the width of modular framework 102 as well as the length. Hydraulic hoses 160 and other connections 162 may then be extended through interior guides 158 on either side of the dual-frame modular framework 102.

FIGS. 25 and 26 compare single-frame and dual-frame embodiments of paving operations system 100. Referring to FIG. 25, single-frame modular framework 102 incorporates frame members 106a, 106b, and 106c. Power unit 104 is bolted to the frame member 106a directly connected to drive end car 114a, and accessory pod 112 is bolted to the frame member directly connected to walking end car 114b, to which attachment plate 132 is similarly bolted. Referring to FIG. 26, dual-frame modular framework 102 additionally incorporates frame members 106d, 106e and 106f transversely mounted to frame members 106a, 106b, and 106c respectively and longitudinally mounted to each other. In dual-frame embodiments of modular framework 102, walking end car 114b may have telescoping capability to accommodate multiple frame members 106. Dual attachment plates 132a and 132b are bolted to frame members 106c and 106f respectively. In dual-frame embodiments, extending the transverse width of modular framework 102 may involve removal of attachment plates 132a and 132b, mounting of additional frame members 106 to frame members 106c and 106f (and to each other) via combination frame mount flanges 176, moving walking end car 114b laterally along modular framework 102 to a position substantially flush with open combination frame mount flanges 176 of the additional frame members 106, and reattachment of attachment plates 132a and 132b to the additional frame members 106.

Figure 27A:
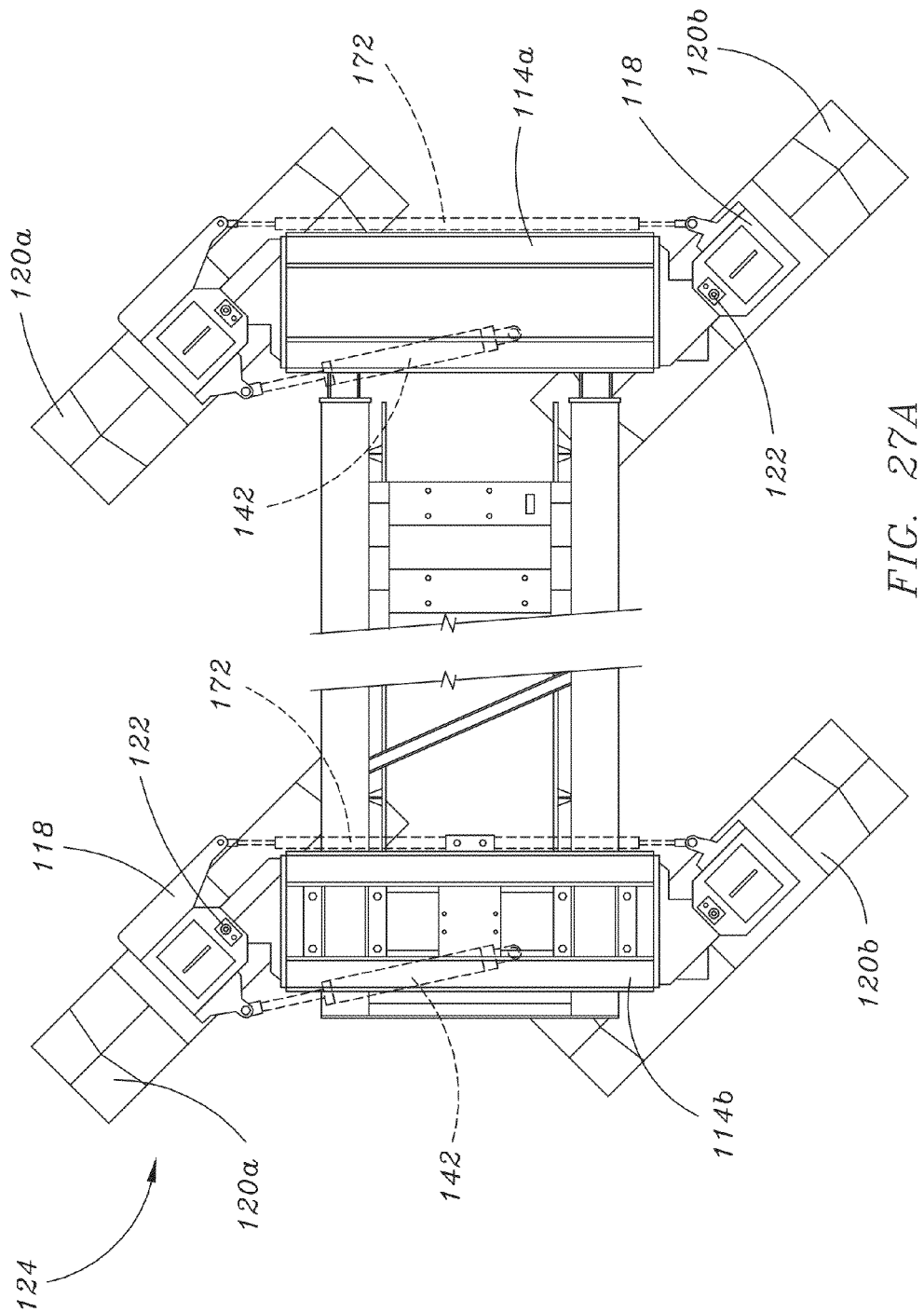
FIG. 27A is a top elevational view of an embodiment of a steering assembly of the present invention.
Figure 27B:
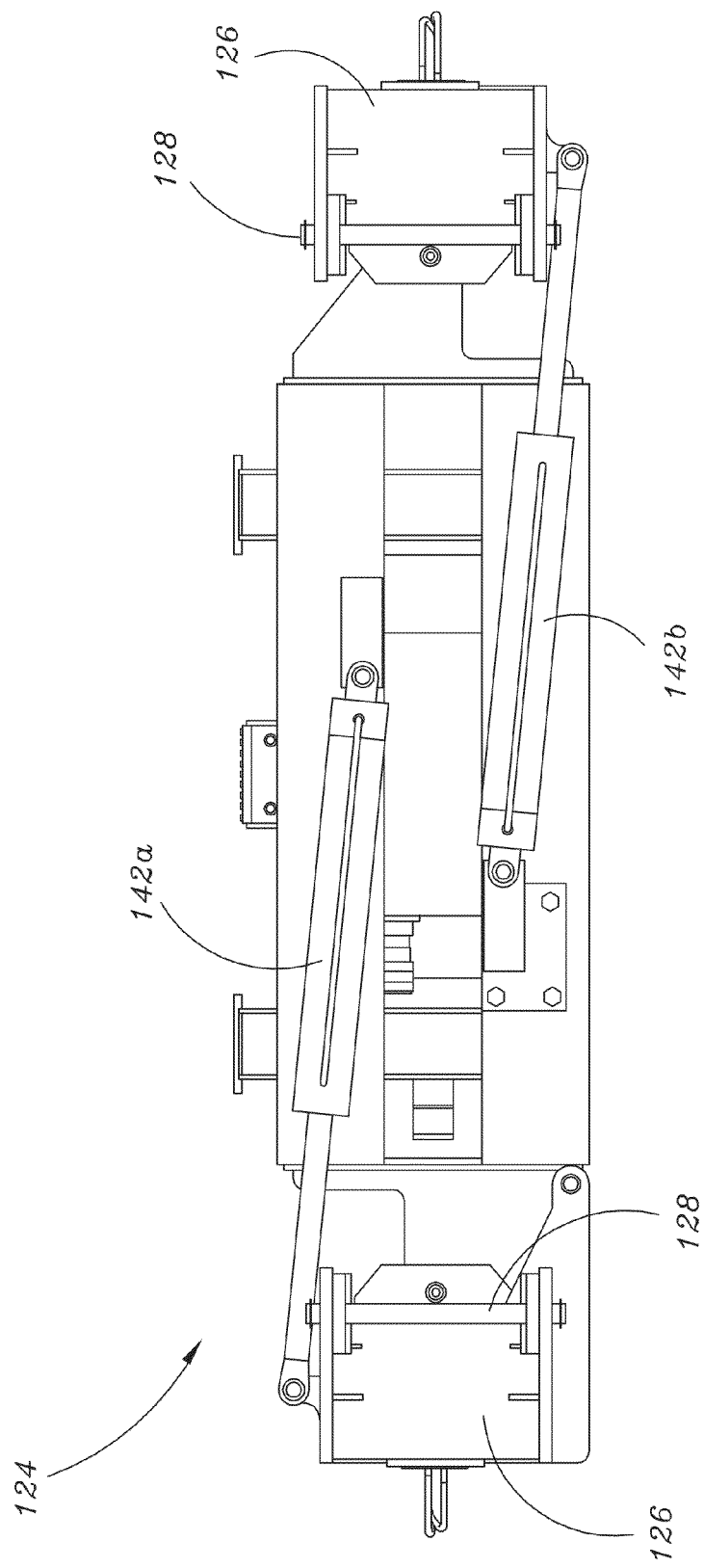
FIG. 27B is a bottom elevational view of an embodiment of a steering assembly of the present invention.

FIGS. 27A and 27B illustrate alternative embodiments of steering assembly 124. Operations to extend or reduce the width of system 100 may require the steerable crawlers 120 at one end of system 100 to steer independently, e.g., for moving an end car 114 along modular framework 102 to a new position while system 100 remains stationary. Similarly, transporting system 100 may require precision steering to maneuver system 100 onto a transport vehicle. Finally, embodiments of system 100 may benefit from electronically controlled crab steering in addition to skid steering for maintaining system 100 in a desired operating orientation while paving, texturing, etc. Referring to FIG. 27A, fixed end cars 114a or telescoping end cars 114b may be connected to adjustable legs 118 via leg pivots 122, and legs 118 are in turn connected to front steerable crawlers 120a and rear steerable crawlers 120b. In embodiments of steering assembly 124, steering cylinder 142 may articulate front steerable crawler 120 to rotate in response to commands from the control system or a user. Steering tie rod 172, connecting front steerable crawler 120a to rear steerable crawler 120b, may then articulate rear steerable crawler 120b to rotate in unison with front steerable crawler 120a.

Referring to FIG. 27B, alternative embodiments of steering assembly 124 may incorporate dual steering cylinders 142a and 142b linked to a track mount yoke 126 and track pin 128, which in turn articulates steerable crawlers 120. In response to commands from the control system of system 100 or a user, steering cylinders 142a and 142b may articulate their respective steering tracks 120 to rotate in unison through track mount yoke 126 and track pin 128. Steering cylinders 142a and 142b may also articulate a single steerable crawler 120 independently to provide precision crab steering corrections in operating and transitional configurations. In preferred embodiments, steering cylinders 142a and 142b are "smart" hydraulic steering cylinders equipped with sensors configured to continually relay position data to the control system. In preferred embodiments, the control system of system 100 incorporates a steering control system including system controls for electric over hydraulic steering and grade control. Steering assembly 124 may be configured to rotate one or both steerable crawlers 120 through a continuous 90-degree range from an operational orientation (a longitudinal orientation perpendicular to the modular framework) to a transport orientation (a transverse orientation parallel to the modular framework). In preferred embodiments, steering assembly 124 is configured to provide an additional 8 degrees of steering correction. The control system may make steering corrections in response to user input or based on sensor data. For example, a user may input crab steering corrections while configuring system 100 for transport, or the control system may correct steering based on data collected from grade elevation or slab elevation sensors during a texturing operation.

Figure 28A:
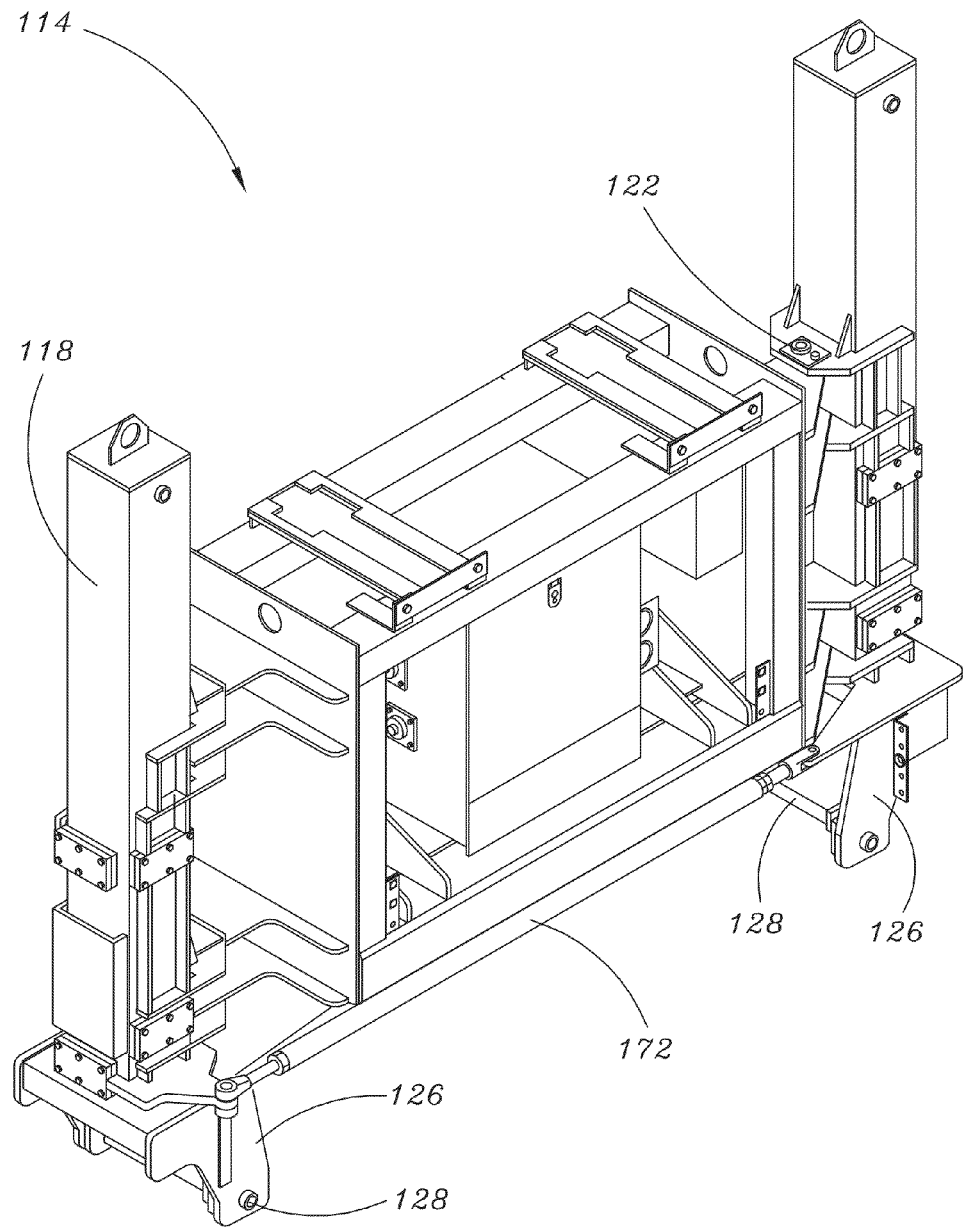
FIG. 28A is an end elevational view of an embodiment of an end frame of the present invention.
Figure 28B:
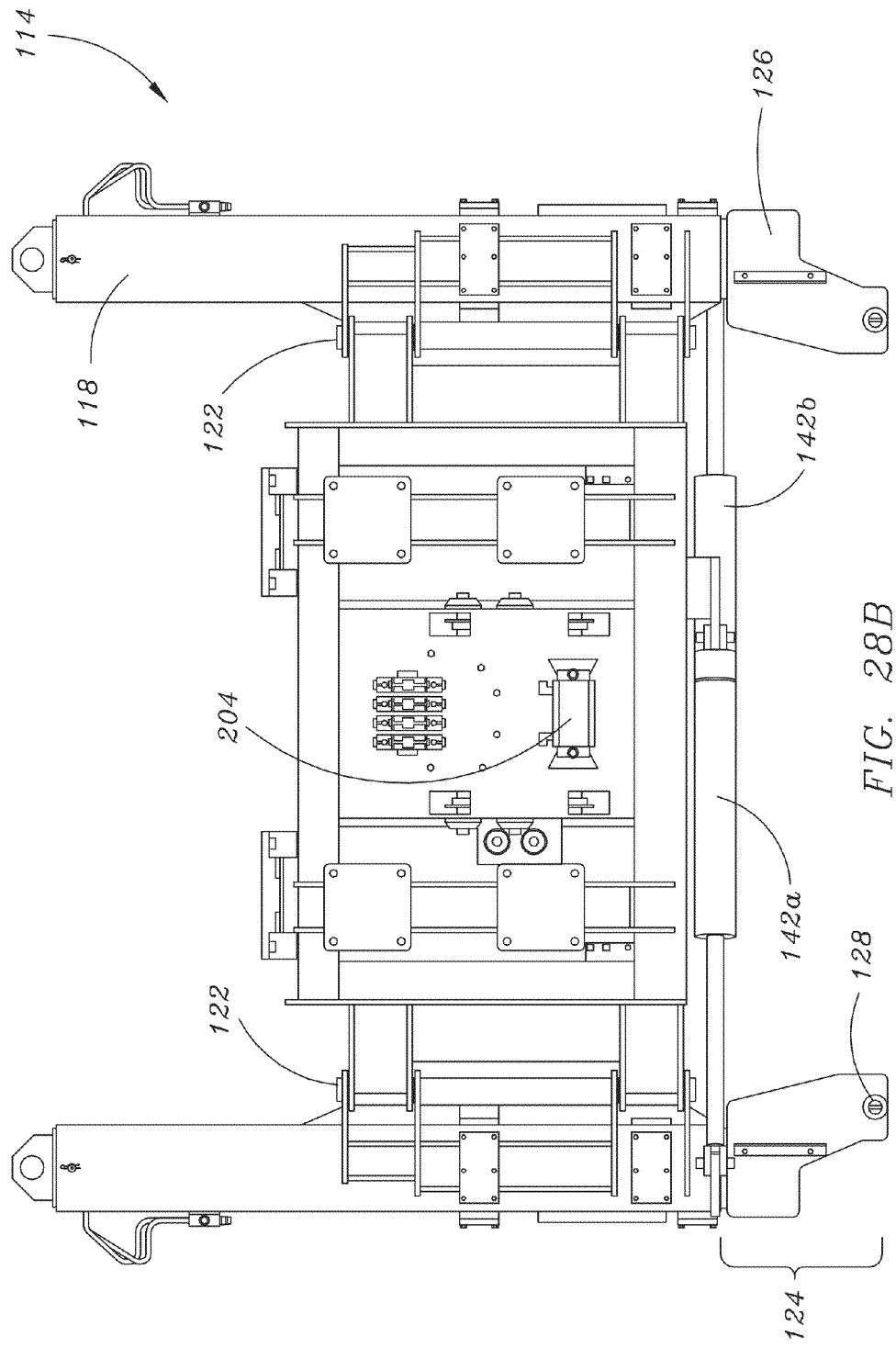
FIG. 28B is an end elevational view of an embodiment of an end frame of the present invention.

FIGS. 28A and 28B illustrate alternative embodiments of fixed end car 114. Referring to FIG. 28A, adjustable legs 118 may be mounted to end car 114 via leg pivots 122. Steerable crawlers 120 may then be mounted to legs 118 via track mount yoke 126 and track pin 128, so that steerable crawlers 120 may rotate around legs 118; legs 118 may pivot in order to allow steerable crawlers 120 greater mobility without manual adjustments to end car 114 or rerouting of hydraulics and other connections. Embodiments of end car 114 may include a steering assembly 124 incorporating one or more steering cylinders 142, smart steering cylinders, tie rods 172, or other like means for articulating steerable crawlers 120. Steering tie rod 172, for example, may articulate rear steerable crawler 120 in unison with front steerable crawler 120 when front steerable crawler 120 rotates in response to commands from a user or the control system of paving operations system 100.

Referring to FIG. 28B, alternative embodiments of end car 114 may include a steering assembly 124 incorporating dual steering cylinders 142a and 142b, each of which may be configured to articulate a single steerable crawler 120 via track mount yoke 126 and track pin 128. In response to user commands or the control system of paving operations system 100, both steering cylinders 142 may articulate in unison the front and rear steerable crawlers 120 mounted to end car 114 via adjustable legs 118 mounted to end car 114 via leg pivots 122. Embodiments of end car 114 may additionally incorporate a flow divider 204 for use in conjunction with cure tank 112 or spray bar assembly 152.

Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "connected", or "coupled", to each other to achieve the desired functionality, and any two components capable of being so associated may also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A configurable paving operations system, comprising:
    a modular framework having a transverse width and including at least a first frame insert and a second frame insert, each frame insert having a first end including a connector and a second end including a connector, and at least one rail system along its length, the second end of the first frame insert removably coupled to the first end of the second frame insert via connector, wherein the transverse width of the modular framework is configured to at least one of extend via the addition of at least one frame insert and retract via the removal of at least one frame insert;
    at least a first end structure and a second end structure, the first end structure coupled to the first end of the first frame insert and the second end structure at least one of coupled to the second end of the second frame insert and slidably coupled to the modular framework via the at least one rail system;
    each end structure having at least an attachment plate couplable to a frame insert via connector, at least a first adjustable leg and a second adjustable leg coupled to the end structure, and a plurality of steerable crawlers including at least a first steerable crawler rotatably coupled to the first adjustable leg and a second steerable crawler rotatably coupled to the second adjustable leg selected from a plurality of steerable crawlers;
    each end structure including a steering assembly operatively coupled to the plurality of steerable crawlers, configured to rotate at least one of the first steerable crawler and the second steerable crawler; and
    a control system.

2. The system of claim 1, wherein each frame insert of the plurality of frame inserts has a size selected from a plurality of sizes, the size defined by at least one of a length, a width, a height, and a structural thickness.

3. The system of claim 1, wherein the control system includes at least one of a steering control system operably coupled to the at least one steering assembly, a propulsion control system, a trimming control system, a slope control system, a spray control system, a grade control system, a tining control system, a plurality of sensors, and a user interface.

4. The system of claim 3, wherein the at least one steering assembly includes at least one steering cylinder, each steering cylinder including at least one sensor communicatively coupled to the control system.

5. The system of claim 4, wherein the at least one steering cylinder is a hydraulic steering cylinder.

6. The system of claim 4, wherein the at least one steering assembly includes at least one steering cylinder and at least one tie rod.

7. The system of claim 1, further comprising at least one accessory removably coupled to the modular framework.

8. The system of claim 7, wherein the at least one accessory is at least one of a cure tank, an engine console, a walkway, an operating platform, a sensor operably coupled to the control system, an undercarriage, a texture rake, a texture broom, a texture drag, a spray bar assembly, a roller, an auger, a spreader, a trimmer, a form, a mold, a pan, a finisher, a saw, a bar inserter, a screed, a placer, a conveyor, and a plow.

9. The system of claim 8, wherein the engine console is at least one of a gasoline engine and a diesel engine.

10. The system of claim 8, wherein the operating platform includes an operating console having a display unit and a user input device communicatively coupled to the control system.

11. The system of claim 8, wherein the undercarriage includes
a hydraulic height adjuster operably coupled to the control system and configured to at least one of raise and lower the undercarriage through a vertical range; and
at least one accessory removably coupled to the undercarriage.

12. The system of claim 11, wherein at least two accessories may be removably coupled to the undercarriage simultaneously.

13. The system of claim 11, wherein the control system further comprises:
at least one sensor mounted to at least one of the undercarriage, hydraulic height adjuster, and the accessories; and
at least one proximity sensor mounted to the at least one accessory.

14. The system of claim 1, wherein the at least one rail system includes at least one of a rail and a slot spanning the length of the frame insert, the rail system configured to slidably couple to at least one of a corresponding slot and a corresponding rail mounted on at least one of an end structure and an accessory.

15. The system of claim 14, wherein the corresponding slot includes at least one of a bearing, a cushion, and a guide.

16. A configurable paving operations system, comprising:
a modular framework having a transverse width and including at least a first frame insert and a second frame insert, each frame insert having a first end including a connector and a second end including a connector, and at least one rail system along its length, the second end of the first frame insert removably coupled to the first end of the second frame insert via connector;
at least a first end structure and a second end structure, the first end structure coupled to the first end of the first frame insert and the second end structure at least one of coupled to the second end of the second frame insert and slidably coupled to the modular framework via the at least one rail system;
each end structure having at least an attachment plate couplable to a frame insert via connector, at least a first adjustable leg and a second adjustable leg coupled to the end structure, and a plurality of steerable crawlers including at least a first steerable crawler rotatably coupled to the first adjustable leg and a second steerable crawler rotatably coupled to the second adjustable leg;
each end structure including a steering assembly operatively coupled to the plurality of steerable crawlers, configured to rotate at least one of the first steerable crawler and the second steerable crawler;
a control system including:
(i) at least one accessory removably coupled to the modular framework selected from the group including at least one of the following: a cure tank, an engine console, a walkway, an operating platform, a sensor operably coupled to the control system, an undercarriage, a hydraulic height adjuster configured to at least one of raise and lower the undercarriage through a vertical range; a texture rake, a texture broom, a texture drag, a spray bar assembly, a roller, an auger, a spreader, a trimmer, a form, a mold, a pan, a finisher, a saw, a bar inserter, a screed, a placer, a conveyor, and a plow;
(ii) at least one sensor mounted to at least one of the undercarriage, the hydraulic height adjuster, and the at least one accessory; and
(iii) at least one proximity sensor mounted to the at least one accessory.

17. A method for extending the width of a paving operations system having a modular framework including at least a first frame insert and a second frame insert, at least one rail system spanning the modular framework, at least a first end structure mounted to the first frame insert and a second end structure, the first end structure and the second end structure both having an inner end, an outer end, and a front adjustable leg operably coupled to a front steerable crawler and a rear adjustable leg operably coupled to a rear steerable crawler, the paving operations system including at least one component operably coupled to a control system, comprising:
securing the machine for extension;
connecting a third frame insert to the second frame insert;
disconnecting at least one of a service connection and a hydraulic hose coupling the at least one component to the control system;
rotating at least the front steerable crawler and the rear steerable crawler of the second end structure to an orientation substantially parallel to the modular framework;
directing the second end structure transversely along the rail system until the outer end of the second end structure is flush with the third frame insert;
connecting at least one of a connection and a hydraulic hose coupling the at least one component to the control system;
rotating the at least the front steerable crawler and the rear steerable crawler of the second end structure to an orientation substantially perpendicular to the modular framework; and
securing the machine for operation.

18. A method for reducing the width of a paving operations system having a modular framework including at least a first, second, and third frame insert, at least one rail system spanning the modular framework, at least a first end structure mounted to the first frame insert and a second end structure, the first end structure and the second end structure both having an inner end, an outer end, a front adjustable leg operably coupled to a front steerable crawler and a rear adjustable leg operably coupled to a rear steerable crawler, the paving operations system including at least one component operably coupled to a control system, comprising:
securing the machine for retraction;
disconnecting at least one of a service connection and a hydraulic hose coupling the at least one component to the control system;

rotating at least the front steerable crawler and the rear steerable crawler of the second end structure to an orientation substantially parallel to the modular framework;

directing the second end structure transversely along the rail system until the outer end of the second end structure is flush with the second frame insert;

disconnecting the third frame insert from the second frame insert;

connecting at least one of a connection and a hydraulic hose coupling the at least one component to the control system;

rotating at least one of the front steerable crawler and the rear steerable crawler of the second end structure to an orientation substantially perpendicular to the modular framework; and securing the machine for operation.

\* \* \* \* \*